US012670462B2

(12) United States Patent
Sankaran et al.

(10) Patent No.: US 12,670,462 B2
(45) Date of Patent: *Jun. 30, 2026

(54) DECENTRALIZED SHIPPING NETWORK USING BLOCKCHAINS

(71) Applicant: eBay Inc., San Jose, CA (US)

(72) Inventors: Nambi Sankaran, Sunnyvale, CA (US);
Constanza Maria Heath, Cannon Beach, OR (US); Someshekhar Banerjee, Pleasanton, CA (US); Abhishek Pandey, San Jose, CA (US); Mikhail Tsirelson, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/790,977

(22) Filed: Jul. 31, 2024

(65) Prior Publication Data

US 2024/0394645 A1 Nov. 28, 2024

Related U.S. Application Data

(63) Continuation of application No. 17/748,782, filed on May 19, 2022, now Pat. No. 12,118,500, which is a
(Continued)

(51) Int. Cl.
*G06Q 20/40* (2012.01)
*G06F 16/182* (2019.01)
(Continued)

(52) U.S. Cl.
CPC ..... *G06Q 10/0832* (2013.01); *G06F 16/1824* (2019.01); *G06F 16/2379* (2019.01);
(Continued)

(58) Field of Classification Search
CPC ..... G06Q 10/00–30; G06Q 20/00–425; G06Q 30/00–08; G06F 16/00–986;
(Continued)

(56) References Cited

U.S. PATENT DOCUMENTS

| | | | |
|---|---|---|---|
| 5,831,860 A | 11/1998 | Foladare et al. | |
| 7,035,856 B1 * | 4/2006 | Morimoto | B65D 23/14 |
| | | | 707/999.01 |

(Continued)

FOREIGN PATENT DOCUMENTS

| | | |
|---|---|---|
| CN | 101160598 | 4/2004 |
| CN | 202979284 | 6/2013 |

(Continued)

OTHER PUBLICATIONS

"CryptoTec AG Blockchain for the Automotive Industry", Retrieved from the Internet URL : <https://test.cryptotec.com//wp-content/uploads/2018/01/Blockchain_for_Automotive_CryptoTec_EN.pdf>, Jan. 1, 2018, 5 Pages.
(Continued)

*Primary Examiner* — Chenyuh Kuo
(74) *Attorney, Agent, or Firm* — FIG. 1 Patents

(57) ABSTRACT

Technologies are shown for shipping route selection involving receiving sender and recipient shipping information for an item to be shipped and obtaining shipping route options for the item based on the sender and recipient shipping information. The route options are provided for display and selection of an option. A routing data block is created for the item at an address on a blockchain that stores shipping information for each stage of the selected route. A shipping tag is encoded with the blockchain address and attached to the item. The tag can be scanned to obtain the blockchain address and request information for a next stage of the shipping route from the block. The next shipping information from the block is received and utilized to ship the item to a next geolocation. The next shipping information can be determined based on current conditions, such as weather, pricing and availability.

20 Claims, 19 Drawing Sheets

Related U.S. Application Data continuation of application No. 16/455,284, filed on Jun. 27, 2019, now Pat. No. 11,379,785.

(60) Provisional application No. 62/825,710, filed on Mar. 28, 2019.

(51) Int. Cl.

| | |
|---|---|
| *G06F 16/23* | (2019.01) |
| *G06F 16/955* | (2019.01) |
| *G06K 7/14* | (2006.01) |
| *G06K 19/07* | (2006.01) |
| *G06Q 10/08* | (2024.01) |
| *G06Q 10/083* | (2024.01) |
| *G06Q 10/0832* | (2023.01) |
| *G06Q 10/0833* | (2023.01) |
| *G06Q 10/0834* | (2023.01) |
| *G06Q 10/0835* | (2023.01) |
| *G06Q 20/38* | (2012.01) |
| *G06Q 30/0283* | (2023.01) |
| *G06Q 30/08* | (2012.01) |
| *H04L 9/00* | (2022.01) |
| *H04L 9/06* | (2006.01) |
| *H04L 9/08* | (2006.01) |
| *H04L 9/32* | (2006.01) |

(52) U.S. Cl.
CPC ......... *G06F 16/955* (2019.01); *G06K 7/1408* (2013.01); *G06K 19/0717* (2013.01); *G06Q 10/08* (2013.01); *G06Q 10/0833* (2013.01); *G06Q 10/08345* (2013.01); *G06Q 10/0835* (2013.01); *G06Q 10/08355* (2013.01); *G06Q 20/382* (2013.01); *G06Q 20/3825* (2013.01); *G06Q 20/4014* (2013.01); *G06Q 30/0283* (2013.01); *G06Q 30/08* (2013.01); *H04L 9/0637* (2013.01); *H04L 9/0643* (2013.01); *H04L 9/0869* (2013.01); *H04L 9/3242* (2013.01); *H04L 9/3263* (2013.01); *H04L 9/50* (2022.05)

(58) Field of Classification Search
CPC ...... G06K 7/00–1495; G06K 19/00–18; H04L 9/00–50
See application file for complete search history.

(56) References Cited

U.S. PATENT DOCUMENTS

| | | | |
|---|---|---|---|
| 7,130,771 | B2 | 10/2006 | Aghassipour |
| 7,624,024 | B2 | 11/2009 | Levis et al. |
| 7,647,231 | B2 | 1/2010 | Kuebert et al. |
| 8,412,489 | B2 | 4/2013 | Kadaba |
| 8,707,352 | B1 | 4/2014 | Crespo et al. |
| 9,436,923 | B1 | 9/2016 | Sriram et al. |
| 9,760,854 | B1 | 9/2017 | Chowdhary |
| 9,767,426 | B2 | 9/2017 | Siegel et al. |
| 9,830,571 | B2 | 11/2017 | Betancourt |
| 9,849,364 | B2 | 12/2017 | Tran et al. |
| 9,857,188 | B1 | 1/2018 | O'Hare et al. |
| 10,102,526 | B1 * | 10/2018 | Madisetti ............. G06Q 20/389 |
| 10,447,483 | B1 | 10/2019 | Su |
| 10,600,009 | B1 * | 3/2020 | Augustine ........... G06F 16/9024 |
| 10,643,171 | B1 | 5/2020 | Zhang |
| 10,721,060 | B1 | 7/2020 | Kaizer et al. |
| 10,871,948 | B1 * | 12/2020 | Dowling ................. G06F 8/311 |
| 11,144,868 | B1 * | 10/2021 | McBride ............ G06Q 10/0834 |
| 11,379,785 | B2 * | 7/2022 | Sankaran ............ G06Q 20/407 |
| 11,449,819 | B2 | 9/2022 | Heath et al. |
| 11,468,390 | B2 | 10/2022 | Sanskaran et al. |
| 11,651,321 | B2 | 5/2023 | Sankaran et al. |
| 11,748,687 | B2 | 9/2023 | Gray et al. |
| 11,842,317 | B2 | 12/2023 | Heath et al. |
| 12,118,500 | B2 * | 10/2024 | Sankaran ........... G06Q 20/3827 |
| 12,254,440 | B2 | 3/2025 | Heath et al. |
| 2002/0165729 | A1 | 11/2002 | Kuebert et al. |
| 2003/0125963 | A1 | 7/2003 | Haken |
| 2003/0163378 | A1 | 8/2003 | Podgurny et al. |
| 2003/0173405 | A1 | 9/2003 | Wilz et al. |
| 2004/0254893 | A1 | 12/2004 | Tsuei et al. |
| 2005/0052284 | A1 | 3/2005 | Schmidtberg et al. |
| 2005/0259658 | A1 | 11/2005 | Logan et al. |
| 2006/0282277 | A1 | 12/2006 | Ng |
| 2007/0210916 | A1 | 9/2007 | Ogushi et al. |
| 2008/0052044 | A1 | 2/2008 | Shoenfeld |
| 2008/0111674 | A1 | 5/2008 | Quine |
| 2009/0303052 | A1 | 12/2009 | Aklepi et al. |
| 2010/0164686 | A1 | 7/2010 | Johnson |
| 2010/0299640 | A1 | 11/2010 | Titus |
| 2011/0258130 | A1 | 10/2011 | Grabiner |
| 2012/0023555 | A1 | 1/2012 | Putterman |
| 2012/0106859 | A1 | 5/2012 | Cheatle |
| 2012/0173448 | A1 | 7/2012 | Rademaker |
| 2012/0235791 | A1 | 9/2012 | Donlan et al. |
| 2014/0035721 | A1 | 2/2014 | Heppe et al. |
| 2014/0180959 | A1 | 6/2014 | Gillen et al. |
| 2014/0244537 | A1 | 8/2014 | Jani et al. |
| 2014/0266712 | A1 | 9/2014 | Bobo et al. |
| 2014/0372334 | A1 | 12/2014 | Wrentmore |
| 2014/0379603 | A1 | 12/2014 | Bodenhamer et al. |
| 2015/0046361 | A1 | 2/2015 | Williams et al. |
| 2015/0046364 | A1 | 2/2015 | Kriss |
| 2015/0154559 | A1 | 6/2015 | Barbush et al. |
| 2015/0382085 | A1 | 12/2015 | Lawrie-Fussey et al. |
| 2016/0042317 | A1 | 2/2016 | Goodman et al. |
| 2016/0063433 | A1 | 3/2016 | Glasgow et al. |
| 2016/0071051 | A1 | 3/2016 | Tibbs et al. |
| 2016/0078744 | A1 | 3/2016 | Gieck et al. |
| 2016/0098730 | A1 | 4/2016 | Feeney et al. |
| 2016/0171439 | A1 | 6/2016 | Ladden et al. |
| 2016/0260059 | A1 | 9/2016 | Benjamin et al. |
| 2016/0350712 | A1 | 12/2016 | Wesemann et al. |
| 2017/0109696 | A1 | 4/2017 | Serjeantson et al. |
| 2017/0121021 | A1 | 5/2017 | Bonazzoli et al. |
| 2017/0147976 | A1 | 5/2017 | Koch et al. |
| 2017/0180128 | A1 | 6/2017 | Lu |
| 2017/0180134 | A1 | 6/2017 | King |
| 2017/0221052 | A1 | 8/2017 | Sheng et al. |
| 2017/0229000 | A1 | 8/2017 | Law |
| 2017/0243213 | A1 | 8/2017 | Castinado et al. |
| 2017/0257358 | A1 | 9/2017 | Ebrahimi et al. |
| 2017/0262790 | A1 | 9/2017 | Khasis |
| 2017/0270472 | A1 | 9/2017 | High et al. |
| 2017/0276507 | A1 | 9/2017 | Zacharenko |
| 2017/0286901 | A1 | 10/2017 | Skaff et al. |
| 2017/0329980 | A1 | 11/2017 | Hu et al. |
| 2017/0344988 | A1 | 11/2017 | Cusden et al. |
| 2017/0357001 | A1 | 12/2017 | Green et al. |
| 2018/0024554 | A1 | 1/2018 | Brady et al. |
| 2018/0032759 | A1 | 2/2018 | Radocchia et al. |
| 2018/0089638 | A1 * | 3/2018 | Christidis .......... G06Q 10/0639 |
| 2018/0096175 | A1 | 4/2018 | Schmeling et al. |
| 2018/0097635 | A1 | 4/2018 | Moses |
| 2018/0108024 | A1 | 4/2018 | Greco et al. |
| 2018/0137512 | A1 | 5/2018 | Georgiadis et al. |
| 2018/0158020 | A1 | 6/2018 | Khasis |
| 2018/0167198 | A1 | 6/2018 | Muller et al. |
| 2018/0174093 | A1 | 6/2018 | Perez |
| 2018/0174097 | A1 | 6/2018 | Liu et al. |
| 2018/0174157 | A1 | 6/2018 | Endress et al. |
| 2018/0220278 | A1 | 8/2018 | Tal et al. |
| 2018/0232693 | A1 | 8/2018 | Gillen et al. |
| 2018/0253691 | A1 | 9/2018 | High et al. |
| 2018/0255131 | A1 | 9/2018 | Stöcker et al. |
| 2018/0264347 | A1 | 9/2018 | Tran et al. |
| 2018/0276611 | A1 | 9/2018 | Dromerhauser et al. |
| 2018/0285810 | A1 | 10/2018 | Ramachandran et al. |
| 2018/0343114 | A1 * | 11/2018 | Ben-Ari ................. H04L 9/302 |
| 2018/0349896 | A1 | 12/2018 | Arora et al. |
| 2019/0006037 | A1 | 1/2019 | Jacobs et al. |
| 2019/0012637 | A1 | 1/2019 | Gillen |

(56) References Cited

U.S. PATENT DOCUMENTS

| | | | |
|---|---|---|---|
| 2019/0014116 A1 | 1/2019 | Khi et al. | |
| 2019/0019144 A1 | 1/2019 | Gillen | |
| 2019/0034863 A1 | 1/2019 | Winkle et al. | |
| 2019/0036932 A1 | 1/2019 | Bathen et al. | |
| 2019/0043001 A1 | 2/2019 | Woulfe et al. | |
| 2019/0102735 A1 | 4/2019 | Barton et al. | |
| 2019/0114714 A1 | 4/2019 | Jones et al. | |
| 2019/0164241 A1 | 5/2019 | Bässler et al. | |
| 2019/0197531 A1 | 6/2019 | Peenikal et al. | |
| 2019/0205898 A1 | 7/2019 | Greco et al. | |
| 2019/0266550 A1 | 8/2019 | Santosh et al. | |
| 2019/0293443 A1 | 9/2019 | Kelly et al. | |
| 2019/0303852 A1 | 10/2019 | Chopko et al. | |
| 2019/0333130 A1 | 10/2019 | Jha et al. | |
| 2019/0372786 A1 | 12/2019 | Ra et al. | |
| 2020/0005240 A1 | 1/2020 | Ko et al. | |
| 2020/0014528 A1 | 1/2020 | Karthik et al. | |
| 2020/0042933 A1 | 2/2020 | Jurich, Jr. et al. | |
| 2020/0052880 A1 | 2/2020 | Bathen et al. | |
| 2020/0118086 A1 | 4/2020 | Achkir | |
| 2020/0125269 A1 | 4/2020 | Karame et al. | |
| 2020/0142739 A1 | 5/2020 | Chan et al. | |
| 2020/0211000 A1 | 7/2020 | Narasimhan | |
| 2020/0244470 A1 | 7/2020 | Ruckriemen et al. | |
| 2020/0265516 A1 | 8/2020 | Xu | |
| 2020/0272985 A1* | 8/2020 | Karakostas | ........ G06Q 10/0832 |
| 2020/0311665 A1 | 10/2020 | Gray et al. | |
| 2020/0311666 A1 | 10/2020 | Gray et al. | |
| 2020/0311670 A1 | 10/2020 | Sankaran et al. | |
| 2020/0311675 A1 | 10/2020 | Sankaran et al. | |
| 2020/0311676 A1 | 10/2020 | Smith, Jr. | |
| 2020/0313897 A1 | 10/2020 | Heath et al. | |
| 2020/0313903 A1 | 10/2020 | Yu | |
| 2021/0272049 A1 | 9/2021 | Gillen et al. | |
| 2022/0108266 A1 | 4/2022 | Smith et al. | |
| 2022/0351125 A1 | 11/2022 | Sankaran et al. | |
| 2022/0391831 A1 | 12/2022 | Heath et al. | |
| 2023/0059581 A1 | 2/2023 | Sankaran et al. | |
| 2023/0351312 A1 | 11/2023 | Gray et al. | |
| 2024/0054437 A1 | 2/2024 | Heath et al. | |
| 2025/0013694 A1 | 1/2025 | Tran | |
| 2025/0086571 A1 | 3/2025 | Heath et al. | |

FOREIGN PATENT DOCUMENTS

| | | |
|---|---|---|
| CN | 103258359 | 8/2013 |
| CN | 107730279 | 2/2018 |
| EP | 3296974 | 3/2018 |
| EP | 3454272 | 3/2019 |
| EP | 3640872 | 4/2020 |
| JP | 2003534582 | 7/2004 |
| WO | WO-0180111 | 10/2001 |
| WO | WO-2013002748 | 1/2013 |
| WO | WO-2015021482 | 2/2015 |
| WO | WO-2017127564 | 7/2017 |
| WO | WO-2018099920 | 6/2018 |
| WO | WO-2020096713 | 5/2020 |
| WO | WO-2020197639 | 10/2020 |
| WO | WO-2020197640 | 10/2020 |
| WO | WO-2020197642 | 10/2020 |
| WO | WO-2020197683 | 10/2020 |

OTHER PUBLICATIONS

U.S. Appl. No. 14/471,420, , "Advisory Action received for U.S. Appl. No. 14/471,420, mailed on May 31, 2018", May 31, 2018, 3 Pages.

U.S. Appl. No. 14/471,420, , "Advisory Action received for U.S. Appl. No. 14/471,420 mailed on Aug. 1, 2022", Aug. 1, 2022, 3 Pages.

U.S. Appl. No. 14/471,420, , "Applicant Initiated Interview Summary Received for U.S. Appl. No. 14/471,420, mailed on Apr. 6, 2020", Apr. 6, 2020, 3 Pages.

U.S. Appl. No. 14/471,420, , "Applicant Initiated Interview Summary received for U.S. Appl. No. 14/471,420, mailed on Nov. 13, 2017", Nov. 13, 2017, 3 Pages.

U.S. Appl. No. 14/471,420, , "Final Office Action", U.S. Appl. No. 14/471,420, filed May 20, 2022, 17 pages.

U.S. Appl. No. 14/471,420, , "Final Office Action received for U.S. Appl. No. 14/471,420, mailed on Aug. 6, 2019", Aug. 6, 2019, 15 Pages.

U.S. Appl. No. 14/471,420, , "Final Office Action Received for U.S. Appl. No. 14/471,420, mailed on Jun. 17, 2020", Jun. 17, 2020, 15 Pages.

U.S. Appl. No. 14/471,420, , "Final Office Action Received for U.S. Appl. No. 14/471,420, mailed on Jun. 18, 2021", Jun. 18, 2021, 16 Pages.

U.S. Appl. No. 14/471,420, , "Final Office Action received for U.S. Appl. No. 14/471,420, mailed on Mar. 15, 2018", Mar. 15, 2018, 18 Pages.

U.S. Appl. No. 14/471,420, , "Non Final Office Action Received for U.S. Appl. No. 14/471,420, mailed on Feb. 7, 2020", Feb. 7, 2020, 20 Pages.

U.S. Appl. No. 14/471,420, , "Non Final Office Action Received for U.S. Appl. No. 14/471,420, mailed on Jan. 7, 2022", Jan. 7, 2022, 18 Pages.

U.S. Appl. No. 14/471,420, , "Non-Final Office Action received for U.S. Appl. No. 14/471,420, mailed on Sep. 11, 2017", Sep. 11, 2017, 15 Pages.

U.S. Appl. No. 14/471,420, , "Non-Final Office Action received for U.S. Appl. No. 14/471,420, mailed on Feb. 26, 2019", Feb. 26, 2019, 18 Pages.

U.S. Appl. No. 14/471,420, , "Non-Final Office Action received for U.S. Appl. No. 14/471,420, mailed on Jan. 28, 2021", Jan. 28, 2021, 17 Pages.

U.S. Appl. No. 14/471,420, , "Response to Advisory Action filed on Aug. 15, 2018, for U.S. Appl. No. 14/471,420, mailed on May 31, 2018", Aug. 15, 2018, 13 Pages.

U.S. Appl. No. 14/471,420, , "Response to Final Office Action filed on May 21, 2018, for U.S. Appl. No. 14/471,420, mailed on Mar. 15, 2018", May 21, 2018, 15 Pages.

U.S. Appl. No. 14/471,420, , "Response to Final Office Action filed on Sep. 17, 2020 for U.S. Appl. No. 14/471,420, mailed on Jun. 17, 2020", Sep. 17, 2020, 13 Pages.

U.S. Appl. No. 14/471,420, , "Response to Final Office Action Filed on Sep. 30, 2019, for U.S. Appl. No. 14/471,420, mailed on Aug. 6, 2019", Sep. 30, 2019, 11 Pages.

U.S. Appl. No. 14/471,420, , "Response to Non-Final Office Action filed on Jan. 11, 2018, for U.S. Appl. No. 14/471,420, mailed on Sep. 11, 2017", Jan. 11, 2018, 14 Pages.

U.S. Appl. No. 14/471,420, , "Response to Non-Final Office Action filed on Jun. 3, 2019 for U.S. Appl. No. 14/471,420, mailed on Feb. 26, 2019", Jun. 3, 2019, 20 Pages.

U.S. Appl. No. 14/471,420, , "Response to Non-Final Office Action filed on May 7, 2020 for U.S. Appl. No. 14/471,420, mailed on Feb. 7, 2020", May 7, 2020, 11 Pages.

U.S. Appl. No. 16/384,362, , "Non-Final Office Action Received for U.S. Appl. No. 16/384,362, mailed on Nov. 5, 2020", Nov. 5, 2020, 18 Pages.

U.S. Appl. No. 16/454,996, , "Final Office Action", U.S. Appl. No. 16/454,996, filed May 2, 2022, 26 pages.

U.S. Appl. No. 16/454,996, , "Final Office Action", U.S. Appl. No. 16/454,996, filed Dec. 5, 2022, 31 pages.

U.S. Appl. No. 16/454,996, , "Non Final Office Action Received for U.S. Appl. No. 16/454,996, mailed on Nov. 30, 2021", Nov. 30, 2021, 20 Pages.

U.S. Appl. No. 16/454,996, , "Non-Final Office Action", U.S. Appl. No. 16/454,996, filed Mar. 1, 2023, 28 pages.

U.S. Appl. No. 16/454,996, , "Non-Final Office Action", U.S. Appl. No. 16/454,996, filed Jul. 21, 2022, 29 pages.

U.S. Appl. No. 16/454,996, , "Notice of Allowance", U.S. Appl. No. 16/454,996, filed May 30, 2023, 7 pages.

U.S. Appl. No. 16/454,996, , "Supplemental Notice of Allowability", U.S. Appl. No. 16/454,996, filed Jun. 5, 2023, 2 pages.

U.S. Appl. No. 16/454,996, , "Supplemental Notice of Allowability", U.S. Appl. No. 16/454,996, filed Aug. 3, 2023, 3 pages.

(56)  References Cited

OTHER PUBLICATIONS

U.S. Appl. No. 16/455,170, , "Decision on Pre-Appeal Brief", U.S. Appl. No. 16/455,170, Apr. 14, 20230, 2 pages.
U.S. Appl. No. 16/455,170, , "Final Office Action", U.S. Appl. No. 16/455,170, Jul. 13, 2022, 19 pages.
U.S. Appl. No. 16/455,170, , "Final Office Action", U.S. Appl. No. 16/455,170, Jan. 9, 2023, 22 pages.
U.S. Appl. No. 16/455,170, , "Final Office ACtion", U.S. Appl. No. 16/455,170, filed Aug. 29, 2023, 25 pages.
U.S. Appl. No. 16/455,170, , "Final Office Action", U.S. Appl. No. 16/455,170, Feb. 14, 2024, 28 pages.
U.S. Appl. No. 16/455,170, , "Non-Final Office Action", U.S. Appl. No. 16/455,170, Sep. 14, 2022, 21 pages.
U.S. Appl. No. 16/455,170, , "Non-Final Office Action", U.S. Appl. No. 16/455,170, Jun. 15, 2023, 25 pages.
U.S. Appl. No. 16/455,170, , "Non-Final Office Action", U.S. Appl. No. 16/455,170, Nov. 6, 2023, 27 pages.
U.S. Appl. No. 16/455,170, , "Non-final Office Action received for U.S. Appl. No. 16/455,170, mailed on Feb. 1, 2022", Feb. 1, 2022, 19 Pages.
U.S. Appl. No. 16/455,284, , "Final Office Action received for U.S. Appl. No. 16/455,284, mailed on Sep. 7, 2021", Sep. 7, 2021, 20 Pages.
U.S. Appl. No. 16/455,284, , "Non Final Office Action Received for U.S. Appl. No. 16/455,284, mailed on Mar. 31, 2021", Mar. 31, 2021, 19 Pages.
U.S. Appl. No. 16/455,284, , "Notice of Allowance received for U.S. Appl. No. 16/455,284, mailed on Feb. 22, 2022", Feb. 22, 2022, 12 Pages.
U.S. Appl. No. 16/455,284, , "Supplemental Notice of Allowability", U.S. Appl. No. 16/455,284, filed Jun. 3, 2022, 2 pages.
U.S. Appl. No. 16/455,284, , "Supplemental Notice of Allowability Received for U.S. Appl. No. 16/455,284, mailed on Mar. 9, 2022", Mar. 9, 2022, 2 Pages.
U.S. Appl. No. 16/457,056, , "Final Office Action", U.S. Appl. No. 16/457,056, filed May 10, 2022, 41 pages.
U.S. Appl. No. 16/457,056, , "Final Office Action received for U.S. Appl. No. 16/457,056, mailed on Sep. 8, 2021", Sep. 8, 2021, 30 Pages.
U.S. Appl. No. 16/457,056, , "Non Final Office Action Received for U.S. Appl. No. 16/457,056, mailed on Apr. 21, 2021", Apr. 21, 2021, 28 Pages.
U.S. Appl. No. 16/457,056, , "Non Final Office Action Received for U.S. Appl. No. 16/457,056, mailed on Dec. 14, 2021", Dec. 14, 2021, 34 Pages.
U.S. Appl. No. 16/457,248, , "Corrected Notice of Allowability", U.S. Appl. No. 16/457,248, filed Aug. 24, 2022, 2 pages.
U.S. Appl. No. 16/457,248, , "Corrected Notice of Allowability", U.S. Appl. No. 16/457,248, filed May 25, 2022, 6 pages.
U.S. Appl. No. 16/457,248, , "Non-final Office Action received for U.S. Appl. No. 16/457,248, mailed on Feb. 3, 2022", Feb. 3, 2022, 14 Pages.
U.S. Appl. No. 16/457,248, , "Notice of Allowance", U.S. Appl. No. 16/457,248, filed May 12, 2022, 8 pages.
U.S. Appl. No. 16/458,645, , "Corrected Notice of Allowability", U.S. Appl. No. 16/458,645, filed Sep. 15, 2022, 2 pages.
U.S. Appl. No. 16/458,645, , "Final Office Action Received for U.S. Appl. No. 16/458,645, mailed on Sep. 28, 2021", Sep. 28, 2021, 35 Pages.
U.S. Appl. No. 16/458,645, , "Non-Final Office Action", U.S. Appl. No. 16/458,645, filed Apr. 15, 2022, 33 pages.
U.S. Appl. No. 16/458,645, , "Non-final Office Action received for U.S. Appl. No. 16/458,645, mailed on Apr. 5, 2021", Apr. 5, 2021, 33 Pages.
U.S. Appl. No. 16/458,645, , "Notice of Allowance received for U.S. Appl. No. 16/458,645, mailed on Jun. 21, 2022", Jun. 21, 2022, 10 pages.
U.S. Appl. No. 17/748,782, , "Non-Final Office Action", U.S. Appl. No. 17/748,782, filed Mar. 21, 2024, 18 pages.
U.S. Appl. No. 17/748,782, , "Notice of Allowance", U.S. Appl. No. 17/748,782, filed May 28, 2024, 12 pages.
U.S. Appl. No. 17/886,947, , "Corrected Notice of Allowability", U.S. Appl. No. 17/886,947, filed Aug. 31, 2023, 2 pages.
U.S. Appl. No. 17/886,947, , "Corrected Notice of Allowability", U.S. Appl. No. 17/886,947, filed Nov. 8, 2023, 2 pages.
U.S. Appl. No. 17/886,947, , "Non-Final Office Action", U.S. Appl. No. 17/886,947, filed Apr. 13, 2023, 13 pages.
U.S. Appl. No. 17/886,947, , "Notice of Allowance", U.S. Appl. No. 17/886,947, filed Aug. 18, 2023, 8 pages.
U.S. Appl. No. 17/893,431, , "Corrected Notice of Allowability", U.S. Appl. No. 17/893,431, filed Apr. 19, 2023, 2 pages.
U.S. Appl. No. 17/893,431, , "Non-Final Office Action", U.S. Appl. No. 17/893,431, filed Jan. 3, 2023, 5 pages.
U.S. Appl. No. 17/893,431, , "Notice of Allowance", U.S. Appl. No. 17/893,431, filed Mar. 1, 2023, 8 pages.
U.S. Appl. No. 18/220,448, , "Final Office Action", U.S. Appl. No. 18/220,448, filed May 7, 2024, 29 pages.
U.S. Appl. No. 18/220,448, , "Non-Final Office Action", U.S. Appl. No. 18/220,448, filed Mar. 11, 2024, 22 pages.
U.S. Appl. No. 18/220,448, , "Non-Final Office Action", U.S. Appl. No. 18/220,448, filed Aug. 23, 2024, 31 pages.
U.S. Appl. No. 18/383,590, , "Corrected Notice of Allowability", U.S. Appl. No. 18/383,590, filed Dec. 2, 2024, 2 pages.
U.S. Appl. No. 18/383,590, , "Non-Final Office Action", U.S. Appl. No. 18/383,590, filed May 22, 2024, 13 pages.
U.S. Appl. No. 18/383,590, , "Notice of Allowance", U.S. Appl. No. 18/383,590, filed Sep. 28, 2024, 8 pages.
202080022859.6, , "Foreign Office Action", CN Application No. 202080022859.6, Nov. 4, 2022, 19 pages.
202080022859.6, , "Foreign Office Action", CN Application No. 202080022859.6, Jun. 17, 2023, 9 pages.
202080022859.6, , "Office Action", CN Application No. 202080022859.6, Mar. 8, 2023, 11 pages.
202080024673.4, , "Foreign Office Action", CN Application No. 202080024673.4, Oct. 17, 2023, 10 pages.
202080024673.4, , "Notice of Allowance", CN Application No. 202080024673.4, Feb. 8, 2024, 3 pages.
202080024681.9, , "Foreign Office Action", CN Application No. 202080024681.9, Nov. 2, 2022, 17 pages.
202080024681.9, , "Notice of Decision to Grant", CN Application No. 202080024681.9, Jul. 21, 2023, 6 pages.
202080024681.9, , "Office Action received for Chinese Patent Application No. 202080024681.9, mailed on Apr. 28, 2023", Apr. 28, 2023, 8 Pages.
20709018.4, , "Communication under Rule 71(3)", EP Application No. 20709018.4, May 9, 2023, 9 pages.
20709407.9, , "Communication Pursuant to Article 94(3) EPC Received for European Patent Application No. 20709407.9, mailed on Apr. 28, 2023", Apr. 28, 2023, 5 Pages.
20709407.9, , "Foreign Office Action", EP Application No. 20709407.9, Oct. 18, 2024, 7 pages.
20713483.4, , "Communication under Rule 71(3)", EP Patent Application No. 20713483.4, May 10, 2023, 8 pages.
20713483.4, , "Notice of Allowance", EP Application No. 20713483.4, Aug. 28, 2023, 8 pages.
23211923.0, , "Extended European Search Report", EP Application No. 23211923.0, Mar. 1, 2024, 7 pages.
Aitawy, et al., "Lelantos: A Blockchain-based Anonymous Physical Delivery System", 2017 15th Annual Conference on Privacy, Security and Trust, Aug. 2017, 12 Pages.
Boudguiga, et al., "Towards Better Availability and Accountability for IoT Updates by means of a Blockchain", 2017 IEEE European Symposium on Security and Privacy Workshops (EuroS&PW), Apr. 2017, 9 Pages.
Hanhaa, , "Make an Example of Hanhaa's Parcelive—How Else can it be Used?", Retrieved from the Internet URL : <https://hanhaa.com/make-an-example-of-hanhaas-parcelive-how-else-can-it-be-used/?, Jun. 17, 2019, 5 Pages.
Hasan, et al., "Blockchain-Based Proof of Delivery of Physical Assets With Single and Multiple Transporters", Aug. 21, 2018, IEEE vol. 6, 2018, pp. 46781-46793, Aug. 21, 2018, 13 Pages.

(56) References Cited

OTHER PUBLICATIONS

Kostal, Kristian et al., "Management and Monitoring of IoT Devices Using Blockchain", retrieved from <<www.mdpi.com/journal/sensors>>, 2019, 12 pages.
PCT/US2019/053815, , "International Preliminary report received for PCT Patent Application No. PCT/US2019/053815, mailed on May 20, 2021", May 20, 2021, 8 Pages.
PCT/US2019/053815, , "International Search Report received for PCT Application No. PCT/US2019/053815, mailed on Nov. 22, 2019", Nov. 22, 2019, 4 Pages.
PCT/US2019/053815, , "International Written Opinion received for PCT Application No. PCT/US2019/053815, mailed on Nov. 22, 2019", Nov. 22, 2019, 6 Pages.
PCT/US2020/016450, , "International Preliminary Report on Patentability Received for PCT Patent Application No. PCT/US2020/016450, mailed on Oct. 7, 2021", Oct. 7, 2021, 8 Pages.
PCT/US2020/016450, , "International Search Report received for PCT Application No. PCT/US2020/016450, mailed on Apr. 20, 2020", Apr. 20, 2020, 4 Pages.
PCT/US2020/016450, , "Written Opinion received for PCT Patent Application No. PCT/US2020/016450, mailed on Apr. 20, 2020", Apr. 20, 2020, 6 Pages.
PCT/US2020/016453, , "International Preliminary Report on Patentability received for PCT Application No. PCT/US2020/016453, mailed on Oct. 7, 2021", Oct. 7, 2021, 9 Pages.
PCT/US2020/016453, , "International Search Report received for PCT Application No. PCT/US2020/016453, mailed on Apr. 21, 2020", Apr. 21, 2020, 3 Pages.
PCT/US2020/016453, , "Written Opinion received for PCT Patent Application No. PCT/US2020/016453, mailed on Apr. 21, 2020", Apr. 21, 2020, 7 Pages.
PCT/US2020/016680, , "International Preliminary Report on Patentability Received for PCT Patent Application No. PCT/US2020/016680, mailed on Oct. 7, 2021", Oct. 7, 2021, 8 Pages.
PCT/US2020/016680, , "International Search Report received for PCT Application No. PCT/US2020/016680, mailed on Apr. 24, 2020", Apr. 24, 2020, 4 Pages.

PCT/US2020/016680, , "Written Opinion received for PCT Patent Application No. PCT/US2020/016680, mailed on Apr. 24, 2020", Apr. 24, 2020, 6 Pages.
PCT/US2020/019976, , "International Preliminary Report on Patentability received for PCT Application No. PCT/US2020/019976, mailed on Oct. 7, 2021", Oct. 7, 2021, 7 Pages.
PCT/US2020/019976, , "International Search Report received for PCT Application No. PCT/US2020/019976, mailed on Apr. 23, 2020", Apr. 23, 2020, 3 Pages.
PCT/US2020/019976, , "International Written Opinion received for PCT Patent Application No. PCT/US2020/019976 , mailed on Apr. 23, 2020", Apr. 23, 2020, 5 Pages.
Saberi, Sara et al., "Blockchain technology and its relationships to sustainable supply chain management", International Journal of Production Research, vol. 57, No. 7 [retrieved May 30, 2023]. Retrieved from the Internet <https://doi.org/10.1080/00207543.2018.1533261>, Oct. 18, 2021, 20 pages.
Wikipedia, , "Spinning pinwheel", Retrieved from Internet URL: https://en.wikipedia.org/wiki/Spinning_pinwheel, Accessed on Dec. 21, 2021, 4 Pages.
Wikipedia, , "Windows wait cursor", Retrieved from Internet URL: https://en.wikipedia.org/wiki/Windows_wait_cursor, Accessed on Dec. 21, 2021, 1 Page.
Yu, Bin et al., "TrustChain: Establishing Trust in the IoT-based Application Ecosystem Using Blockchain", IEEE Cloud Computing, Jul. 2018, 12 pages.
Zhang, et al., "FHIRChain: Applying Blockchain to Securely and Scalably Share Clinical Data", Retrieved from the internet: <https://www.sciencedirect.com/science/article/pii/S2001037018300370>, Jul. 29, 2018, 12 Pages.
"Corrected Notice of Allowability", U.S. Appl. No. 18/383,590, filed Feb. 12, 2025, 2 pages.
"Foreign Office Action", EP Application No. 23211923.0, Feb. 14, 2025, 5 pages.
Foreign Office Action issued in EP 23211923.0, mailed Mar. 20, 2026, 7 pages.
Non-Final Office Action issued in U.S. Appl. No. 18/956,200, mailed Apr. 16, 2026, 13 pages.

* cited by examiner

```
ROUTING DATA BLOCK                                  242

ITEM(ID)
SDR_info(ID, geo-addr, key)
REC_info(ID, geo-addr, key)
Routing[n](shipper_id, geo-addr, key)
Status_data_link

METHODS

Get_next_shipper(SHIPPER_ID, PHYSICAL_data, key) /* Called to
obtain next shipper in route for item */
{
        /* Store the physical status information for item, e.g. location,
time, delivery status, sensor data, etc. */
        Store(PHYSICAL_data, Status_data_link)

/* Find shipper in Routing array and get next shipper info */
        for x=(1,n)
                if (SHIPPER_ID == Routing[x].shipper_id)
                        return(Routing[x+1]) /* return next shipper info */
                else
                        x++
}

Notify(REC_info)  /*  Send arrival notification to recipient and obtain
authorization */
```

FIG. 2B

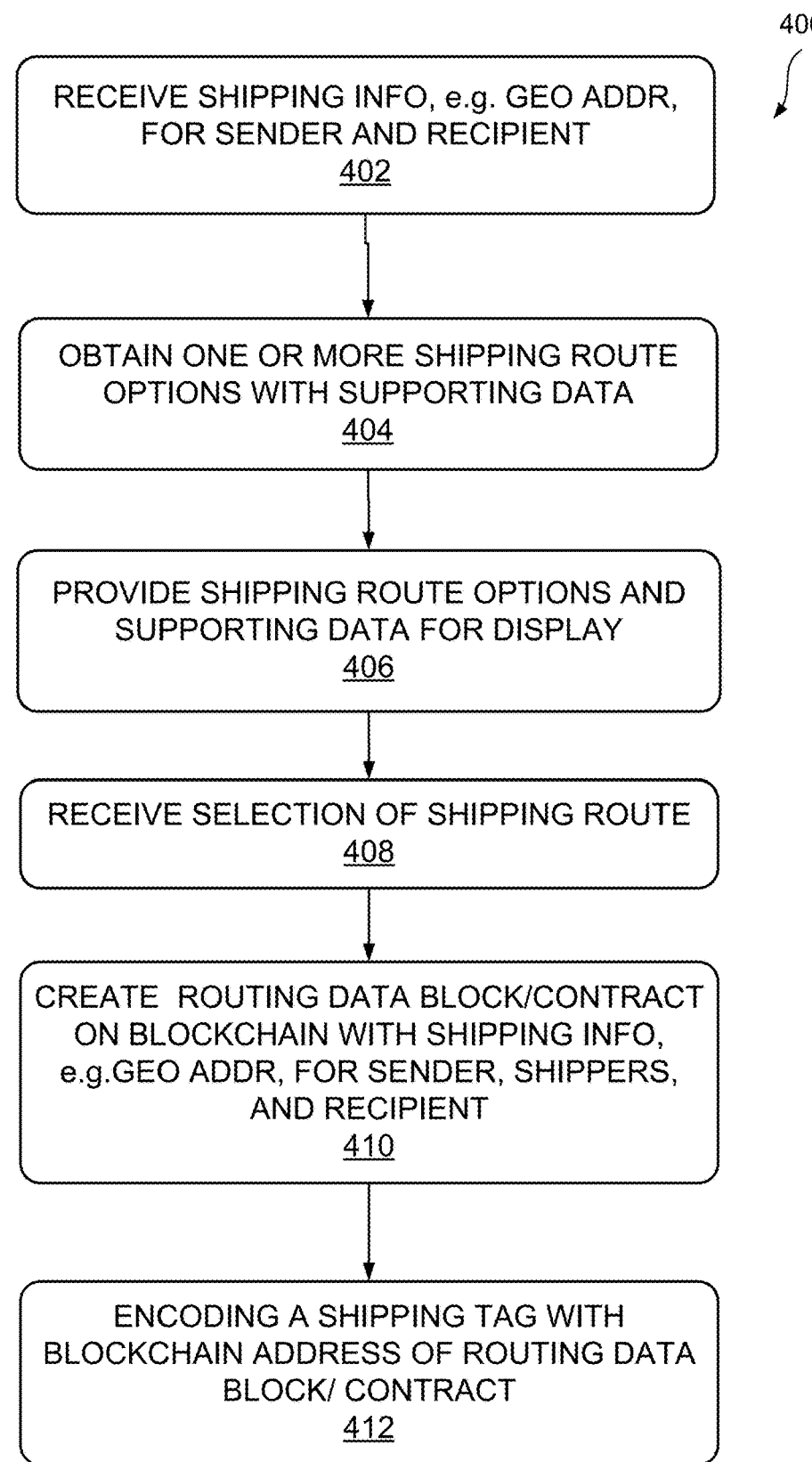

400

RECEIVE SHIPPING INFO, e.g. GEO ADDR, FOR SENDER AND RECIPIENT
402

OBTAIN ONE OR MORE SHIPPING ROUTE OPTIONS WITH SUPPORTING DATA
404

PROVIDE SHIPPING ROUTE OPTIONS AND SUPPORTING DATA FOR DISPLAY
406

RECEIVE SELECTION OF SHIPPING ROUTE
408

CREATE  ROUTING DATA BLOCK/CONTRACT ON BLOCKCHAIN WITH SHIPPING INFO, e.g.GEO ADDR, FOR SENDER, SHIPPERS, AND RECIPIENT
410

ENCODING A SHIPPING TAG WITH BLOCKCHAIN ADDRESS OF ROUTING DATA BLOCK/ CONTRACT
412

Figure 4E:
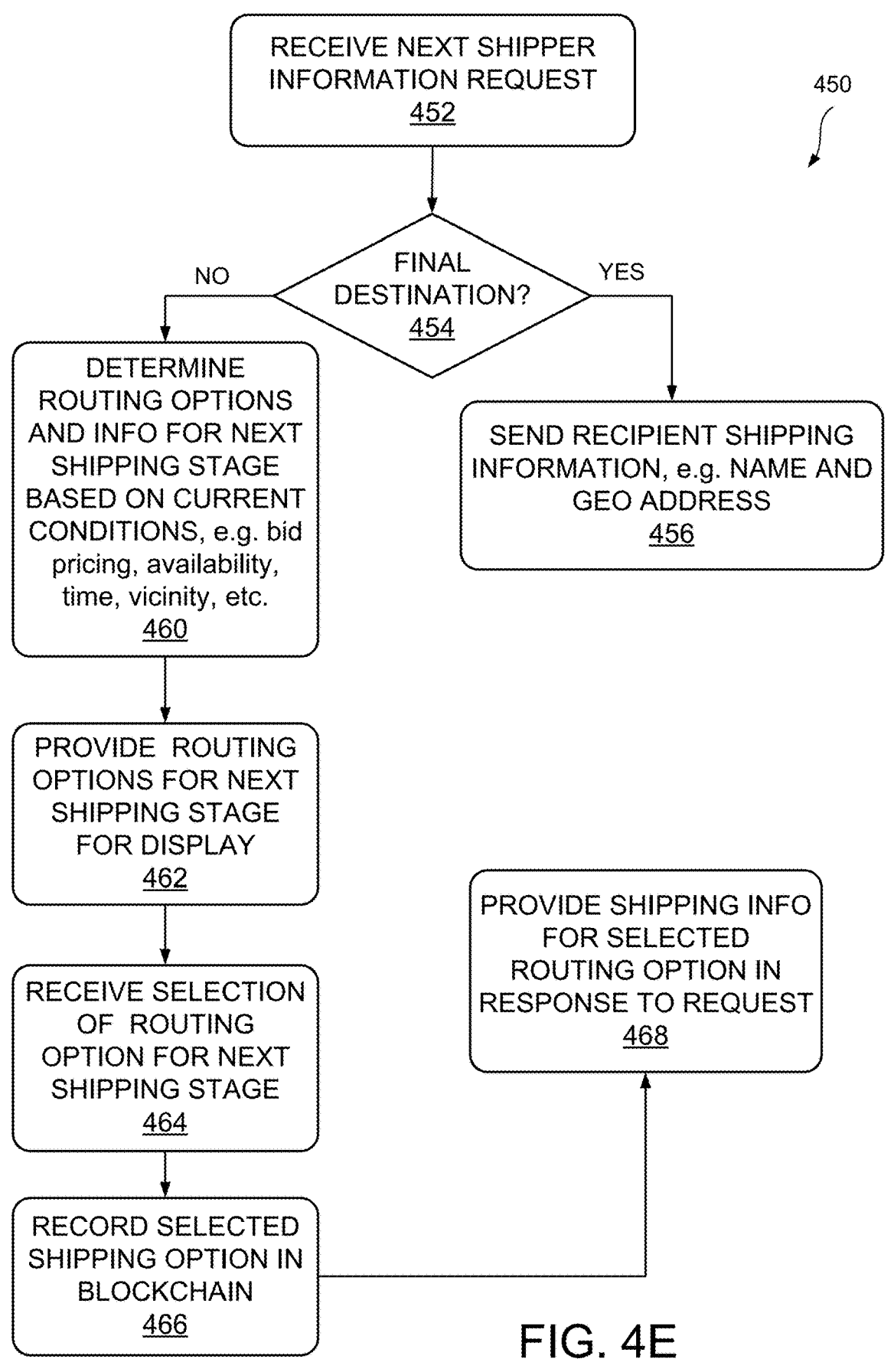

RECEIVE NEXT SHIPPER
INFORMATION REQUEST
452

FINAL
DESTINATION?
454

NO

YES

DETERMINE
ROUTING OPTIONS
AND INFO FOR NEXT
SHIPPING STAGE
BASED ON CURRENT
CONDITIONS, e.g. bid
pricing, availability,
time, vicinity, etc.
460

SEND RECIPIENT SHIPPING
INFORMATION, e.g. NAME AND
GEO ADDRESS
456

PROVIDE ROUTING
OPTIONS FOR NEXT
SHIPPING STAGE
FOR DISPLAY
462

PROVIDE SHIPPING INFO
FOR SELECTED
ROUTING OPTION IN
RESPONSE TO REQUEST
468

RECEIVE SELECTION
OF ROUTING
OPTION FOR NEXT
SHIPPING STAGE
464

RECORD SELECTED
SHIPPING OPTION IN
BLOCKCHAIN
466

Figure 4F:
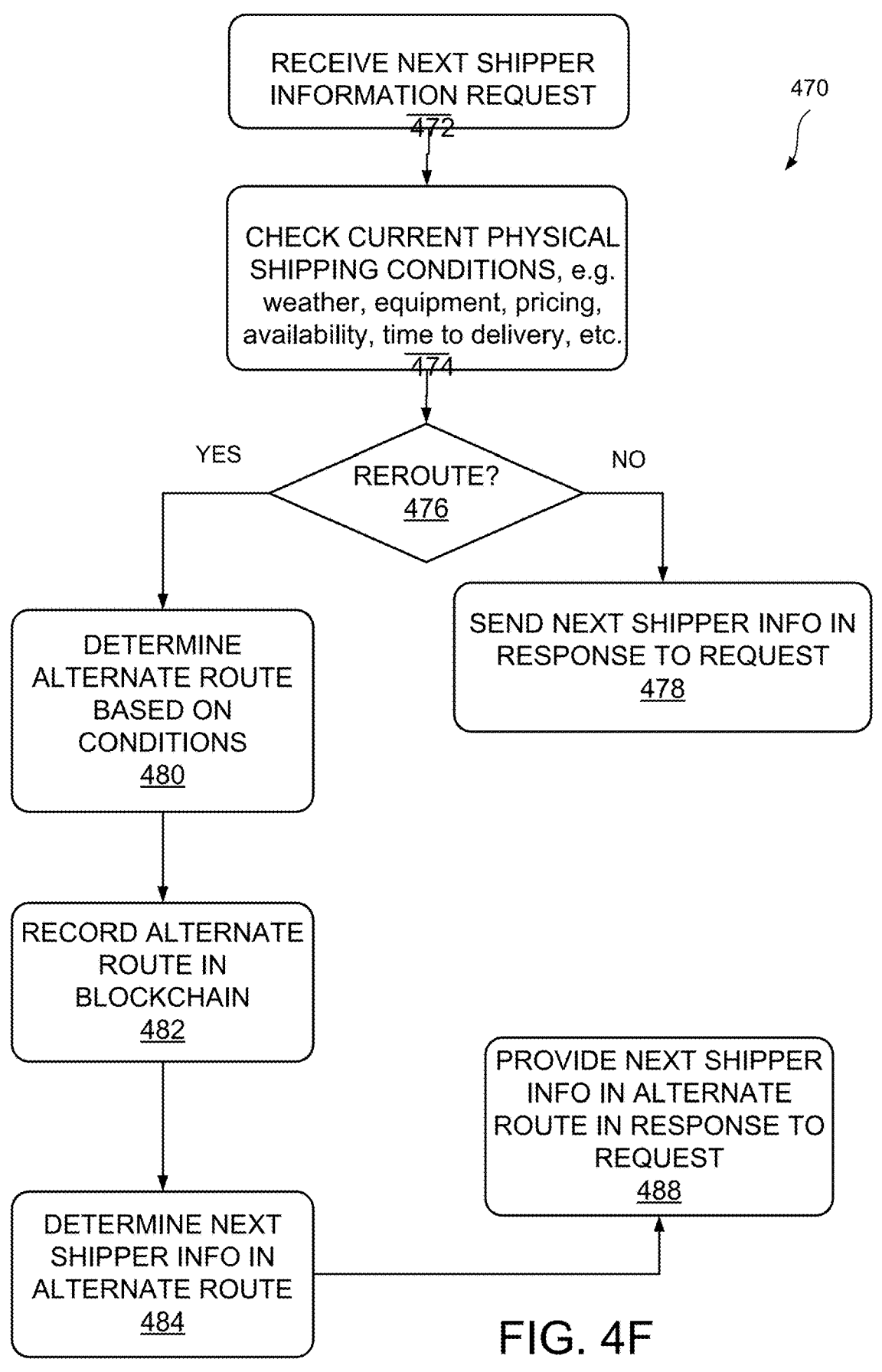

RECEIVE NEXT SHIPPER
INFORMATION REQUEST
472

CHECK CURRENT PHYSICAL
SHIPPING CONDITIONS, e.g.
weather, equipment, pricing,
availability, time to delivery, etc.
474

YES     REROUTE?     NO
476

DETERMINE
ALTERNATE ROUTE
BASED ON
CONDITIONS
480

SEND NEXT SHIPPER INFO IN
RESPONSE TO REQUEST
478

RECORD ALTERNATE
ROUTE IN
BLOCKCHAIN
482

PROVIDE NEXT SHIPPER
INFO IN ALTERNATE
ROUTE IN RESPONSE TO
REQUEST
488

DETERMINE NEXT
SHIPPER INFO IN
ALTERNATE ROUTE
484

DECENTRALIZED SHIPPING NETWORK USING BLOCKCHAINS

RELATED APPLICATIONS

This application is a continuation of and claims priority to U.S. patent application Ser. No. 17/748,782, filed May 19, 2022, entitled "Decentralized Shipping Network Using Blockchains", which claims priority to U.S. patent application Ser. No. 16/455,284, filed Jun. 27, 2019, entitled "Decentralized Shipping Network Using Blockchains", which claims priority from Provisional Application Ser. No. 62/825,710, filed Mar. 28, 2019, entitled "Decentralized Shipping Network Using Blockchains", the entire disclosures of which are hereby incorporated by reference herein in their entirety.

BACKGROUND

At present, shipping packages via traditional courier companies, such as FEDERAL EXPRESS, DHL or UNITED PARCEL SERVICE, is often expensive relative to the value of the goods shipped. For many online transactions, shipping costs must be paid separately by the buyer or seller. This poses a problem for ecommerce platforms as the price of shipping can be high. The additional expense for shipping can be a significant factor in a purchaser's decision to buy an item online or where to buy an item, e.g. purchase the item through an ecommerce platform that includes shipping.

Due to limited competition among courier companies, these couriers typically do not provide volume discounts and insurance nor are returns typically included in the shipping price. There are many other carriers that can pick up and deliver packages, e.g. local courier services. However, local couriers are generally not equipped to ship packages over long distances, e.g. to different cities, states, regions or countries. There are many other carriers that can ship packages long distance, e.g. local couriers and bulk shipping, cartage, and long haul trucking. However, these long distance carriers are normally not equipped to handle large numbers of relatively small packages directed to different geolocations, e.g. physical locations or addresses.

It is with respect to these and other considerations that the disclosure made herein is presented.

SUMMARY

Technologies are disclosed that concern methods, systems and media for shipping route selection that generally involve receiving sender shipping information and recipient shipping information for an item to be shipped, obtaining shipping route options for the item based on the sender shipping information and recipient shipping operation, and providing the shipping route options for display. The disclosed technology can also involve receiving a selection of one of the shipping route options as a selected shipping route option, creating a routing data block for the item on a blockchain, the routing data block having a blockchain address and the routing data block including shipping information for each stage of the selected shipping route, and encoding a shipping tag with the blockchain address of the routing data block for the item.

In certain examples, the shipping tag can be a shipping label or an electronic device for attachment to the item and the involve attaching the shipping tag to the item.

Some examples involve scanning the shipping tag to obtain the blockchain address for the routing data block and generating a request for next shipping information for a next stage of the selected shipping route from the routing data block using the blockchain address from the shipping tag. These examples also involve receiving the next shipping information from the routing data block and shipping the item to a geolocation based on the next shipping information. In particular examples, the next shipping information can be an identifier for a next shipper or a geolocation address for the next shipper.

In yet other examples, the sender shipping information can be an identifier or a geolocation for the sender and the recipient shipping information can be an identifier and a geolocation for the recipient. In these examples, the function of obtaining one or more shipping route options for the item based on the sender shipping information and recipient shipping information includes receiving the geolocation for the sender and the geolocation for the recipient, determining the one or more shipping route options for the item based on the geolocation for the sender and the geolocation for the recipient, and sending the one or more shipping route options for display.

In some of these examples, the operation of determining the one or more shipping route options for the item based on the geolocation for the sender and the geolocation for the recipient involves obtaining supporting data relating to one or more shipping entities and determining the one or more shipping route options for the item based on the geolocation for the sender, the geolocation for the recipient, and the supporting data relating to one or more shipping entities. In these examples, the operation of sending the one or more shipping route options for display includes sending at least a portion of the supporting data relating to one or more shipping entities for display. In some of these examples, the supporting data relating to one or more shipping entities includes one or more of shipping route, pricing, availability, time to ship, delivery date, special handling capability, and reputational data.

Certain examples also involve receiving the request to the blockchain address for the routing data block for next shipping information and, responsive to receiving the request to the blockchain address for the routing data block for next shipping information, determining one or more route options for the next shipping stage based on current conditions and providing the one or more options for the next shipping stage based on current conditions for display. These examples also involve receiving a selection of a selected one of the one or more options for the next shipping stage based on current conditions and providing shipping information for the selected one of the one or more options for the next shipping stage in response to the request to the blockchain address for the routing data block for next shipping information.

In these examples, current conditions can include one or more of current bid pricing, current availability, current time, current geolocation, current availability and equipment for one or more shippers, pickup time, delivery time, current weather conditions, current traffic conditions, an instruction from the recipient, current calendar data for the recipient, and time remaining until promised delivery.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2B is a data architecture diagram showing an illustrative example of a routing data block that includes executable methods;

FIG. 4A is a control flow diagram showing an illustrative example of a process for initiating route selection for an item;

FIG. 4E is a control flow diagram showing an illustrative example of a process for dynamically processing a next address request from an intermediate shipper, where a sender is enabled to make a determination as to the next shipping option;

FIG. 4F is a control flow diagram showing an illustrative example of a process for dynamically processing a next address request from an intermediate shipper based on current physical conditions;

FIG. 8 is a diagram illustrating a distributed computing environment capable of implementing aspects of the techniques and technologies presented herein.

DETAILED DESCRIPTION

Figure 1:
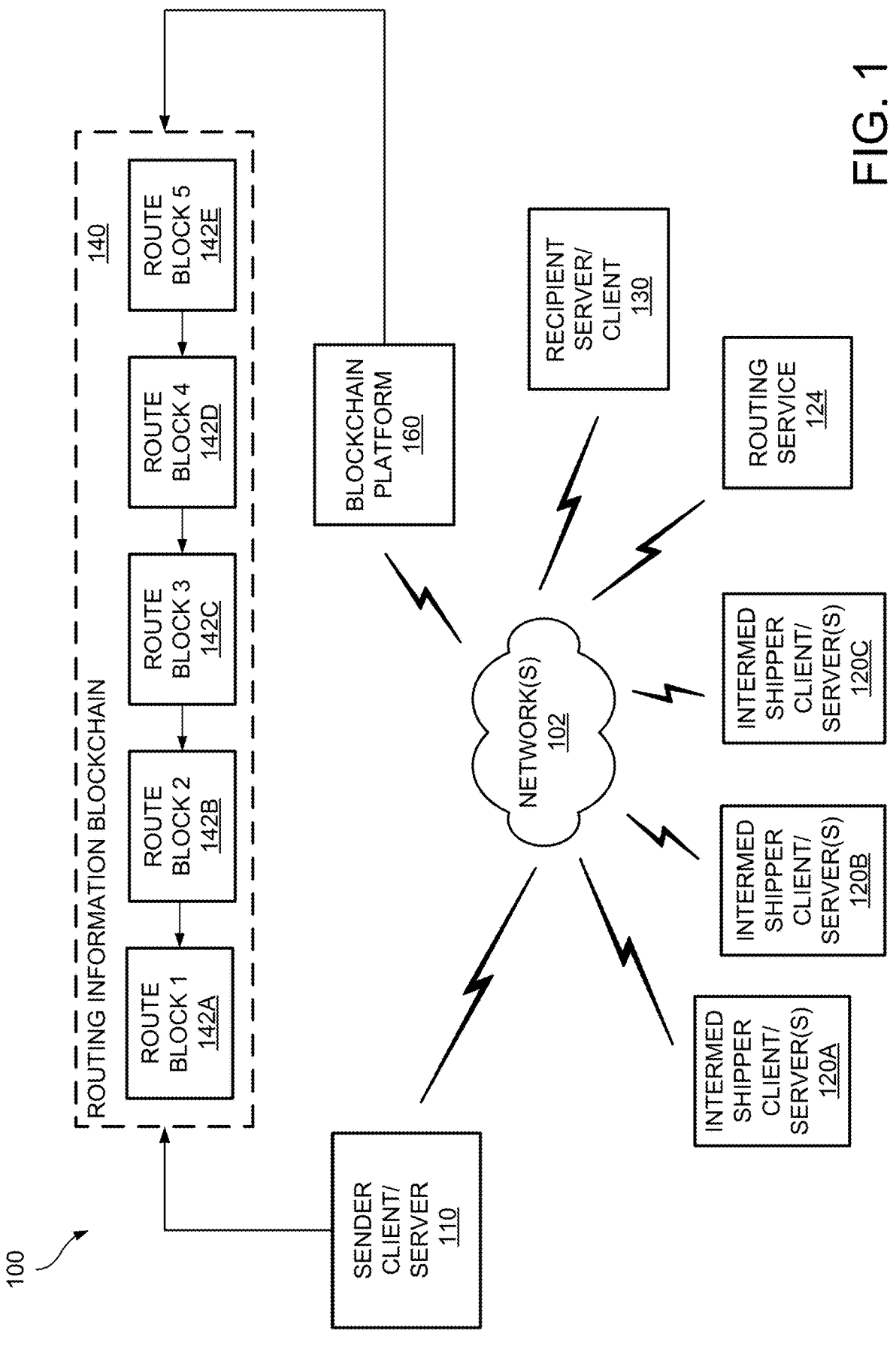
FIG. 1 is an architectural diagram showing an illustrative example of a system for managing package shipment involving multiple shipping entities utilizing routing information on a blockchain.

In general terms, the disclosed technology is directed toward managing and integrating a network of different shipping entities using a blockchain to effectively form a shipping network for the benefit of online sellers and buyers. The disclosed technology can enable route selection for a package as well as manage and track shipment of the package.

Generally speaking, the disclosed technology can create a decentralized shipping network of first mile, last mile and long distance shippers that enables a package to be shipped in a transparent and secure manner. The disclosed technology can enable a consortium of shipping entities to cooperate in order to ship packages and thereby compete with traditional courier carriers.

The disclosed technology is based on consensus in a trusted blockchain network. The identity and information about the sender and receiver can be cryptographically protected from different shipping entities in the shipping network. The network and algorithms create an integrated experience for the sender and receiver. Unlike traditional courier companies, the sender can be provided multiple price quotes and time options for each shipment. Also, based on the time of shipping and availability, the prices can be varied rather than fixed. By contrast, traditional courier companies often charge peak price by default.

The disclosed technology can enable shipping aggregators to obtain the services of first, last and long distance shipping entities in advance and offer volume discounts for senders. The aggregators may also offer insurance, tracking and return services utilizing aspects of the disclosed technology. The disclosed technology can utilize a secure shipping tag that does not include personal information in order to protect the details of sensitive information of the sender or receiver from the multiple shipping entities involve in a route in the shipping network.

An additional aspect of the disclosed technology can enable rerouting of the package during shipment based on shipping price bids, e.g. the disclosed technology may provide rerouting options with constraints, such as maximum price, maximum delivery time, or minimum shipping entity reputation. Another aspect of the disclosed technology can enable the availability of slots or spaces for a specific shipping entity, e.g. an available slot on a specific truck or container, and selection of a specific slot or space for shipping a package.

In addition, it can be advantageous to store the routing information, such as recipient information, in a manner that is secure, e.g. encrypted, to prevent unauthorized access or modification, but can be widely distributed and reliably accessed by authorized entities, such as intermediate shippers.

The secure, distributed and immutable nature of the blockchain allows an intermediate shipper involved in the shipping process to shipping information, such as a name and geolocation address, for a next shipping stage in a shipping route for an item. Shipping agents can use a smartphone or other device connected to the Internet to scan a shipping tag attached to the item that is encoded with a blockchain address for a routing data block with the routing information for the item. Access to the routing information can be controlled such that only an authorized agent can obtain access to part or all of the routing information.

Note that for shipping that uses multiple intermediate shipping entities, certain examples of the disclosed technology can operate such that each intermediate shipping entity is shown only the address of the hand-off or delivery location to the next intermediate shipper. For example, a pickup agent scans the shipping tag on a package and receives an identifier or address for a bulk shipper to which the package is delivered. A bulk shipper transfer agent scans the shipping tag on the package and receives an identifier or address for a next intermediate shipper in a destination city and bulk ships the package to the destination city. At the destination city, another bulk shipper transfer agent scans the machine-readable pointer on the package and receives an identifier or address for a local delivery service to which the package is transferred. An agent for the local delivery service scans the machine-readable pointer on the package to obtain a final delivery address, e.g. recipient address, for the package from the blockchain.

In another example, authentication of intermediate shippers can be required in order to obtain shipping information. Authentication can utilize keys stored for shipping entities in the routing data block. Alternatively, keys can be utilized to encrypt data or communications.

It will be readily appreciated that the disclosed technology is versatile and flexible and can include additional features. For example, the disclosed technology can enable many shipping entities that are not affiliated with one another to collaborate in order to provide competitive shipping options to senders or recipients of items. Also, particular aspects of the disclosed technology can enable an item to by dynamically routed at each stage of shipping based on current conditions, such as pricing, availability, weather or traffic.

One technical advantage of certain aspects of disclosed technology is that the routing information can be maintained securely and selectively released to authorized shipping entities. Since certain aspects of the disclosed technology provide for a recipient to be notified and allow the recipient to provide an alternative geolocation address for delivery, service and security can be improved because the recipient can be notified of a pending arrival of an item and can redirect delivery.

Another technical advantage to certain aspects of the disclosed technology is that the routing information data can be stored on a blockchain and secured by the multi-signature cryptographic and consensus security approaches utilized by the blockchain. Storing routing information data on a blockchain permits the routing information data to be widely distributed and accessible to intermediate shippers and the recipient.

In general, the disclosed technology for managing package shipment involving multiple shipping entities utilizing routing information on a blockchain in accordance with certain aspects of the disclosed technology can limit or control disclosure of routing information during shipping of an item. Aspects of the disclosed technology provide for routing information to be encrypted and selectively released to shippers during shipping and the routing information released can be limited to information needed for a next leg of a shipping chain. Other aspects of the disclosed technology provide for a recipient to be notified that an item is arriving or in a nearby vicinity to the recipient and the recipient can provide an alternative geo location address for delivery of the item.

The following Detailed Description describes technologies for managing package shipment involving multiple shipping entities utilizing routing information on a blockchain in accordance with certain aspects of the disclosed technology. The routing information can be maintained on a blockchain for security, accessibility and immutability.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for managing package shipment involving multiple shipping entities utilizing routing information on a blockchain will be described. As will be described in more detail below with respect to the figures, there are several applications and services that can embody the functionality and techniques described herein.

FIG. 1 is an architectural diagram showing an illustrative example of a system architecture 100 wherein a blockchain platform 160 maintains routing data blockchain 140 that stores routing information and can be accessed via a wide area network 102. A seller or sender client or server 110, intermediary shipper clients or servers 120A-C, routing service 124, and a buyer or recipient client or server device 130, are in communication via a network 102, which also provides communication with decentralized blockchain platform 160 that supports a secure blockchain, such as the ETHEREUM blockchain platform from the ETHEREUM FOUNDATION of Switzerland.

In this example, sender client/server 110 stores encrypted routing information in routing data blocks 142A-E of routing information blockchain 140. When a new item is shipped, a new routing data block 142 can be created and linked to blockchain 140 to store the routing information for the new item.

In addition or alternatively, blockchain 140 can be used to store shipping status information and a new routing data block 142 can be created and linked to blockchain 140 when an intermediate shipper reports a geolocation, status change or other data for an item during shipping. In another addition or alternative, modifications to the routing information can be made during transit and stored in new routing data blocks 142 added to the blockchain.

In the embodiment of FIG. 1, blockchain 140 can be a publicly available blockchain that supports scripting, such as the ETHEREUM blockchain, which supports a SOLIDITY scripting language, or BITCOIN, which supports a scripting language called SCRIPT. Blockchain 140 can also be a private blockchain, or a combination of public and private blockchains can be utilized.

In this example, sender client/server 110 is a seller or sender entity that controls the routing information blockchain 140, where the sender entity owns the blockchain 140 or the routing data blocks 142. The sender can add items and routing information or modify routing information by adding routing data blocks 142 to blockchain 140 that add, delete or modify routing information. In this example, the routing data blocks 142 each require the cryptographic signature of the sender entity to be valid. Also note that the routing information in blocks 142 can be encrypted to limit access to only authorized entities or to restrict access to only a portion of the routing information.

In the example of FIG. 1, sender client/server 110 initiates routing information blockchain 140 by creating genesis block 142A when an item is selected for shipment. In other examples, the routing data blocks 142 can be added to an existing blockchain when items are shipped or routing information is modified. A routing data block 142 can include methods or function calls that are executed by blockchain platform 160 to obtain access to the routing information stored for an item or package on blockchain 140.

In the example of FIG. 1, a routing data block 142 is generated by sender client/server 110 and the block is secured on routing data blockchain 140. In other examples, a routing data block 142 is generated and owned by routing service 124. The routing information stored in routing data blocks 142 can relate to an item or package that is to be handled by multiple intermediate shipping entities, such as intermediate shipper client/servers 120A, 120B or 120C, through which services, operations or access to routing information can be requested. In this example, the intermediate shipper client/servers 120 can communicate with Sender client/server 110 as well as a network of servers for blockchain platform 160 that supports and maintains blockchain 140. For example, the ETHEREUM blockchain platform provides a decentralized, distributed computing platform and operating system that provides scripting functionality.

In one example, sender client/server 110 owns and controls the routing data blocks 142 in routing data blockchain 140. Each routing data block 142 includes routing information, such as sender name and address and recipient name and address, for an item or package selected for shipment. When an item is selected for shipment, the Sender client/server 110 creates a routing data block 142 containing the routing information and links it to routing information blockchain 140. All or part of the routing information can be encrypted to prevent unauthorized access. When routing information is added, modified or deleted, a new routing data block 142 is created that incorporates the changes and the new block 142 is signed by sender client/server 110 and linked to the previous routing data block in the routing information blockchain 140.

Although sender client/server 110 maintains control over the routing information, in this example, the routing information blockchain 140 can be made accessible to other entities, such as intermediate shipper client/servers 120, so that these entities can obtain, trace or audit the relevant routing information stored in the blocks 142 in the blockchain 140.

In some examples, the routing information blockchain 140 may be viewable to other entities through the use of applications that can access blockchain information. By providing access to the routing information blockchain 140, this approach allows users, such as intermediate shipper client/servers 120, to readily access routing information maintained on the routing information blockchain 140 under the control of the sender client/server 110.

In another example, aspects of the routing information blockchain 140 may be restricted to being viewable only to entities that are authorized to access the blockchain 140, such as sender client/server 110 or recipient server/client 130. In certain examples, intermediate shipper client/servers 120 receive access to limited routing information, such as the geolocation and identity of the next intermediate shipper in the shipping chain, or require authentication in order to receive routing information.

In one example scenario, intermediary shipper device 120A is associated with a first local shipper for picking up the package to be shipped from the sender associated with the sender device 110. Intermediary shipper device 120B is associated with a long distance shipper who will transship the package from the sender's locale to the recipient's locale. Intermediary shipper device 120C is associated with a second local Shipper for delivering the package to recipient associated with the recipient device 130.

Various implementations for obtaining routing and shipping information are compatible with the disclosed technology. For example, either a routing service 140 or a service residing in sender device 110 can collect shipping information, such as carriers, carrier quality, availability, price and schedule, and determine routing options for shipping a package from the sender's geolocation address to the recipient's geolocation address. The routing options can be presented to the sender for selection of a routing option for shipping the package. Note that a geolocation address need not be a specific address, but can be a more general location or identifier, such as a town, postal code, carrier, building, company, institution or organization.

Depending on the implementation, in these examples, when the sender selects a shipping route for the package, routing service 124 or a service residing in sender device 110 creates a contract, e.g. a routing data block 142 on blockchain 140, using decentralized blockchain network 160 that defines a shipping route for shipping a package to the geolocation address of the recipient associated with recipient device 130, e.g. multiple intermediate shippers for shipping from the sender to the recipient. The contract includes shipping information, such as a shipper identifier and geolocation address, for each stage of the shipping route for the package. Sender device 110 prints a tag with a machine readable code that points to an address for the contract on the blockchain, which is affixed to the package.

Note that the contract can include logic for conditional release of geolocation address information for the shipping route defined in the contract for the package. The contract can also include logic for dynamically rerouting the package at each stage of the shipping route, such as rerouting based on weather conditions, pricing, availability, proximity, etc.

Figure 2A:
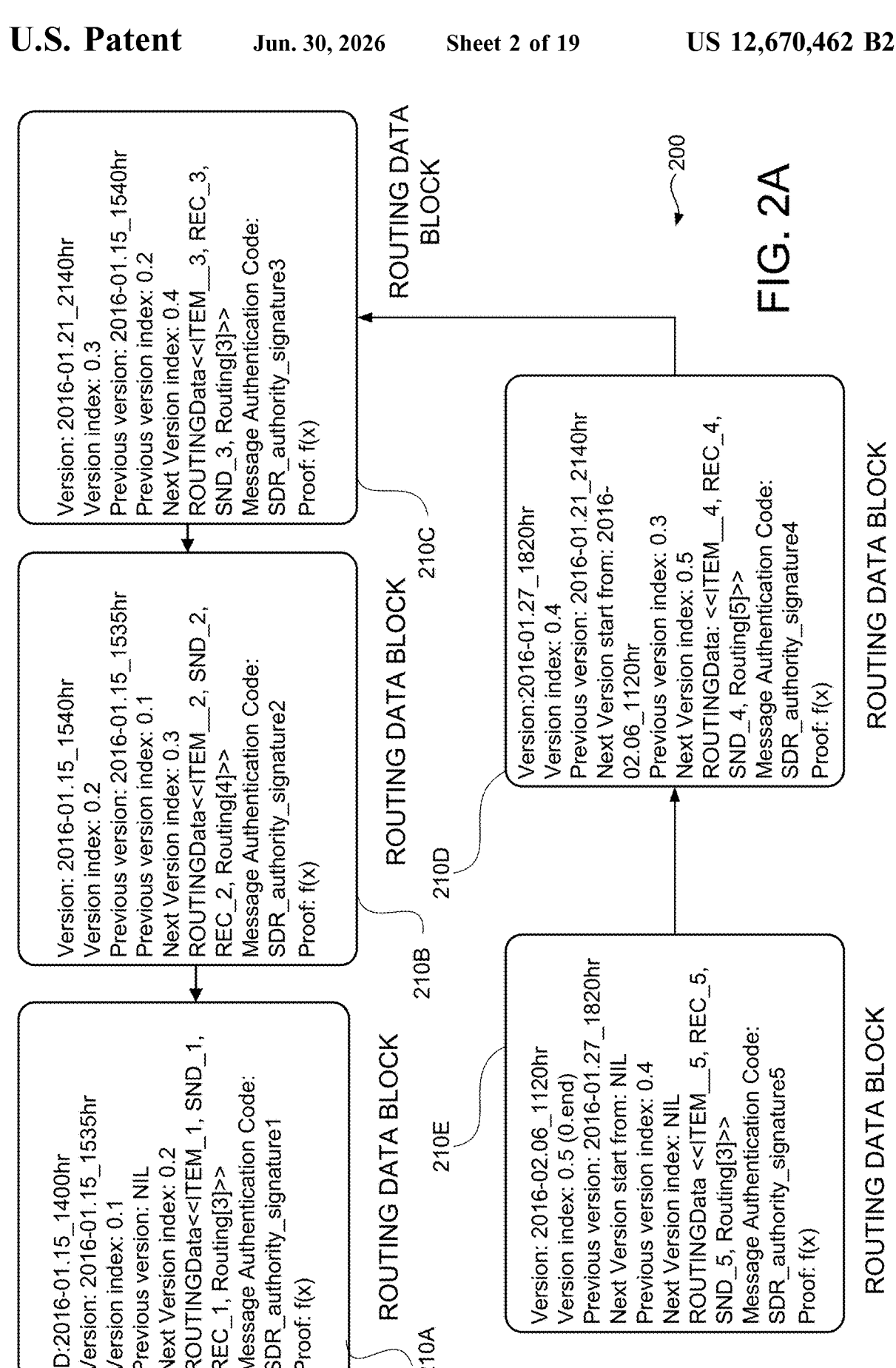
FIG. 2A is a data architecture diagram showing an illustrative example of routing information blockchain with routing data blocks that secure shipping data for items.

FIG. 2A is a data architecture diagram illustrating a simplified example of routing information blockchain ledger 200 based on the blocks 142A-E of the routing information blockchain ledger 140 of FIG. 1. The routing information blockchain ledger 200 example of FIG. 2 is simplified to show block headers, simplified routing information, and signatures of blocks 210A-E in order to demonstrate storage of routing information using a blockchain. In outline, a blockchain ledger may be a globally shared transactional database. Signatures can, in some examples, involve all or part of the data stored in the data the blocks 142A-E and can also involve public key addresses corresponding to the sender entity, the recipient entity, or the intermediate shipping entities.

The blockchain ledger 200 may be arranged as a Merkle tree data structure, as a linked list, or as any similar data structure that allows for cryptographic integrity. The blockchain ledger 200 allows for verification that the routing information has not been corrupted or tampered with because any attempt to tamper will change a Message Authentication Code (or hash) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate $10*10=100$ time units have accrued. A proof of research may indicate that research has been performed. In one example, a proof of research may indicate that a certain amount of computational work has been performed-such as exploring whether molecules interact a certain way during a computational search for an efficacious drug compound.

The blocks 210 of routing information blockchain 200 in the example of FIG. 2 shows securing routing information with a series of routing data blocks on the blockchain. In this example, sender client/server 110 of FIG. 1 stores an array of routing information Routing[3], which indicates three intermediate shipping entities are defined for the shipping route, for a first shipping item identified by ITEM_1, e.g. an item serial number, along with information for a first sender SND_1 and a first recipient REC_1, such as a name and geolocation address for each, in routing data block 210A. Sender client/server 110 signs the routing data block 210A and the blockchain system within which blockchain 200 is created verifies the routing data block based on a proof function.

Also note that a variety of approaches may be utilized that remain consistent with the disclosed technology. In some examples, the routing data blocks 210 are created and owned by routing service 124 or another trusted entity and are signed by the routing service. In some examples, a trusted entity other than the user of sender client/server 110, such as a seller of an item who defines routing information, can create, verify or validate routing data blocks 210A-E. In other examples, multiple entities can be involved in verifying routing data blocks, such as by requiring signatures from sender client/server 110 or routing service 124 and a seller who defines routing information, to verify or validate routing data blocks 210A-E.

In the example of FIG. 2A, routing data blocks 210 of routing data blockchain 200 include routing information along with a signature of sender client/server 110. To add another routing data block for a different shipping item, sender client/server 110 creates routing data block 210B, which identifies the shipping item ITEM_2 and includes an array of routing information Routing[4], indicating that there are four intermediate shipping entities defined for a shipping route for the item, along with information for a second sender SND_2 and a second recipient REC_2. Sender client/server 110 signs routing data block 210B and commits block 210B to blockchain 200 for verification by the blockchain platform. To add a routing data block for an additional shipping item, sender client/server 110 creates routing data block 210C to secure routing information Routing[3] for shipping item ITEM_3 from sender SND_3 to recipient REC_3. Similarly, routing data block 210D stores routing information for ITEM_4 and routing data block 210E stores routing information for ITEM_5.

In certain examples, routing information for an item can be modified by creating a routing data block that stores modified routing information for an item. In these examples, the blockchain structure shown in FIG. 2A would be modified so that routing data blocks with modified routing information an item are linked to previous routing data blocks for the same item. For example, a side chain in the blockchain could contain a series of routing data blocks for an item.

FIG. 2B is a data architecture diagram showing an illustrative example of a routing data block 242 that includes methods that can be executed by a blockchain platform that supports the data block, such as blockchain platform 160. In this example, routing data block 242 includes an ITEM (ID) field for an item identifier value, a SDR_info record with an identifier, geolocation address and key for a sender for the item, a REC_info record with an identifier, geolocation address and key for a recipient.

Routing data block 242 also includes an array Routing[n] with a sequence of records that define a shipping route for the item, where each record includes an identifier shipper_id, a geolocation address geo-addr, and a key for a shipping entity. In this example, the sequence of records in array Routing[n] corresponds to a sequence for the shipping route. The key values provided for the sender, recipient and each shipping entity in the shipping route for the item can be used to cryptographically authenticate the corresponding entity or decrypt communications from the corresponding entity.

In this example, routing data block 242 also includes a Status_data_link that provides a pointer to a data repository or address on a blockchain for storing physical status information, such as geolocation and delivery status at a time. Other physical data can also be stored, such as sensor data relating to temperature, weight loading, humidity, or damage.

As noted above, routing data block 242 can include methods that can be executed by a blockchain platform. In this example, a Get_next_sipper( ) method can be called by a shipper to obtain the routing information for the next shipper in the shipping route defined in Routing[n]. In this example, PHYSICAL_data, such as the location of the item at a given time, is stored at Status_data_link. Routing[n] is then searched to find the record that matches the requesting shipper's SHIPPER_ID. When the requesting shipper's record is found, the next record in sequence in Routing[n] is returned to the requesting shipper.

Figure 2C:
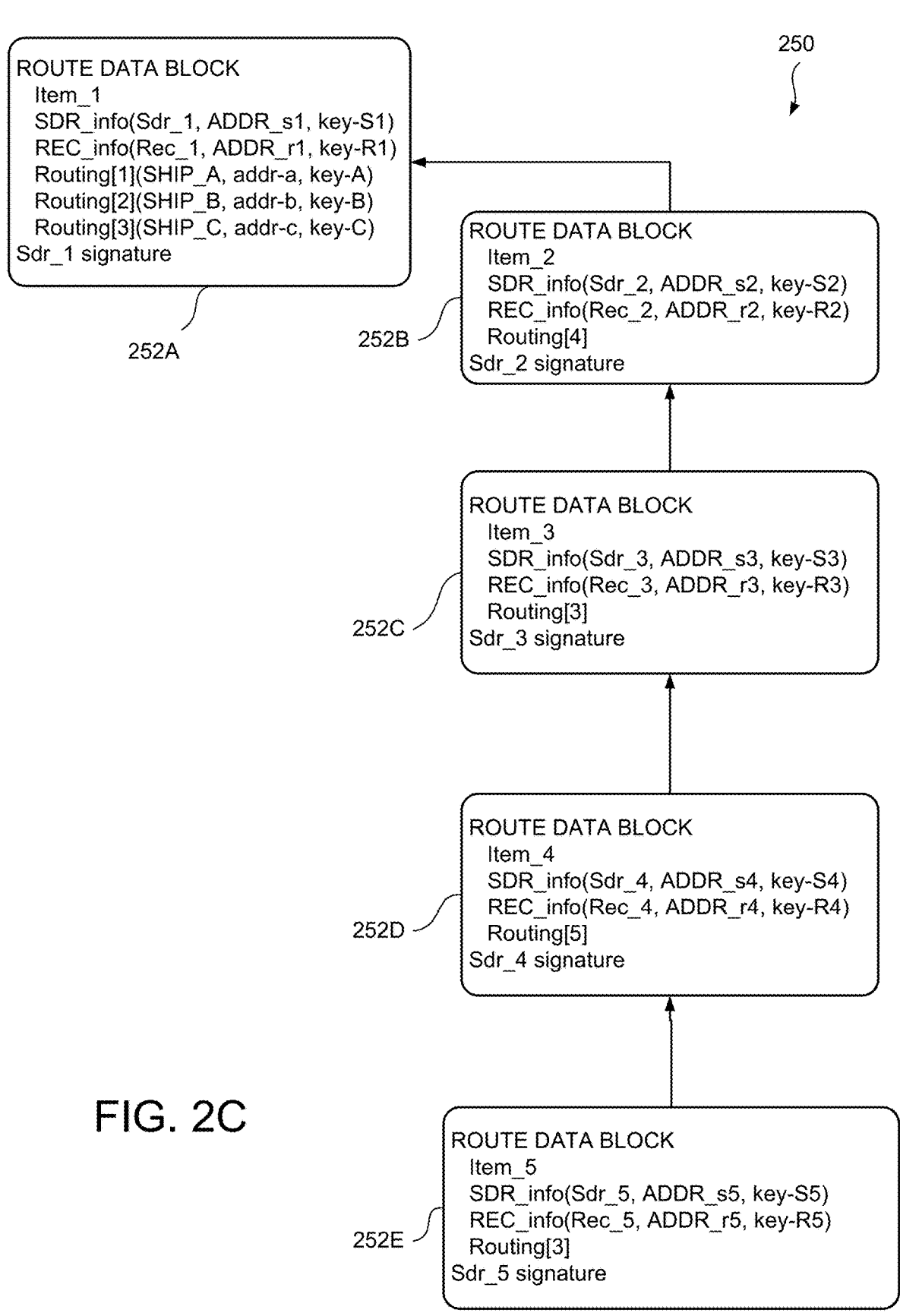
FIG. 2C is a data architecture diagram showing an illustrative example of routing information blockchain with routing data blocks that store routing information for items.

FIG. 2C is a data architecture diagram showing an illustrative example of routing information blockchain 250 with routing information for multiple items secured in multiple routing data blocks 252 in routing information blockchain 250. In this example, each routing data block 252 stores the shipping route for a separate item.

For example, routing data block 252A stores routing information for shipping Item_1 from sender Sdr_1 to recipient Rec_1. The shipping route defined for Item_1 includes three intermediate shippers, SHIP_A, SHIP_B and SHIP_C. In one example, sender client/server 110 scans a shipping tag on Item_1 to obtain a blockchain address for routing data block 252A. Sender client/server access block 252A to obtain the information for the first shipper in the Routing array, e.g. SHIP_A and geolocation addr-a, and transfers Item_1 to shipper SHIP_A. When the item arrives at addr-a of SHIP_A, shipper SHIP_A uses a client/server device 120 to scan the tag and obtain the next shipper information, which is SHIP_B with geolocation address addr-b, from block 252B.

Similarly, each time the item arrives at the next address in the shipping route, the shipper can scan the tag and request the next shipper's information. Thus, in this example, the item is successfully shipped from shipper SHIP_A at addr-a to shipper SHIP_B at addr-b to shipper SHIP_C at addr-C. As noted above, the key values for the shipping entities can be utilized for authentication of the shipping entities or secure communication of information between the shipping entities and routing data block 252A.

In the example shown in FIG. 2C, the shipping route defined in block 252A involves three intermediate shipping entities. In other examples, more or fewer shipping entities can be defined in the shipping route. Also, in some implementations, just the shipper identifier may be utilized or just a shipper geolocation address may be utilized.

Figure 2D:
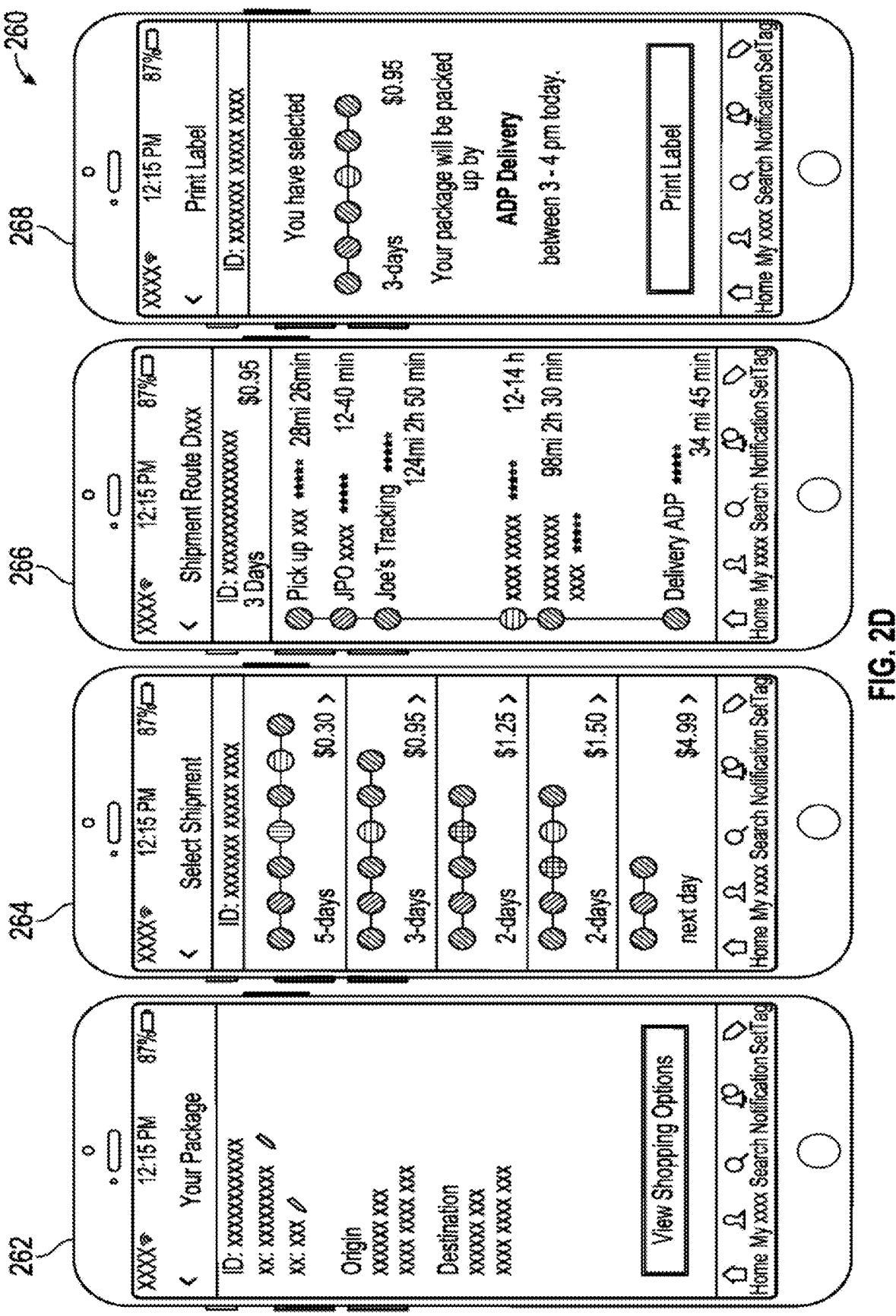
FIG. 2D is a schematic diagram illustrating examples of a user interface that can be utilized to present a sender with shipping options and supporting information and to permit the sender to define the shipping route for a package.

The shipping route or shipping route can be defined for routing data block 252 utilizing a user interface (UI) that can be provided, for example, in a browser client or application on sender device 110. FIG. 2D is a schematic diagram illustrating examples of a UI 260 that can be utilized to present a sender using sender device 110 with shipping options and supporting information and to permit the sender to define the shipping route for a package.

In the UI example shown, using a first UI screen 262, the sender enters the geolocation address of the sender and the recipient. In some examples, additional shipping information or requirements can be entered using UI screen 262, such as the weight and size of the package, required delivery date, physical requirements, e.g. temperature, humidity, vibration, etc.

Based on the information entered using the first UI screen 262, one or more routing options for shipping the package to the recipient are obtained and presented to the sender using UI screen 264 along with relevant supporting shipping information, such as the identity of the available shippers, reputation data for the shippers, pricing for each shipping option, and delivery date options.

In the example shown, five different options are presented with different shipping duration and cost. A next day delivery option involving three shipping entities at a shipping cost of $4.99. A two day option involving five shipping entities at a cost of $1.50. Another two day option involving five shipping entities at a cost of $1.25. A three day option involving six shipping entities at a cost of $0.95. And a five day option involving seven shipping entities at a cost of $0.30.

Additional shipping data can be provided to the sender via UI screen 266, such as quality data for each of the Shippers in a shipping route, so that the sender can make a more informed selection. A sender can utilize the UI 260 to select a shipping route, which is displayed to the sender in a fourth UI screen 268 that shows the selected shipping route, cost, the shipping entities in the selected route, and a time for pickup. Selection of a shipping route results in a routing data block, such as block 252A in FIG. 2C, being generated with the shipping information and committed to the routing information blockchain, e.g. blockchain 250.

It will be readily recognized that the examples provided in FIGS. 2A-D are simplified and non-exclusive. A wide variety of different approaches of varying complexity can be implemented utilizing aspects of the disclosed technology.

Figure 3:
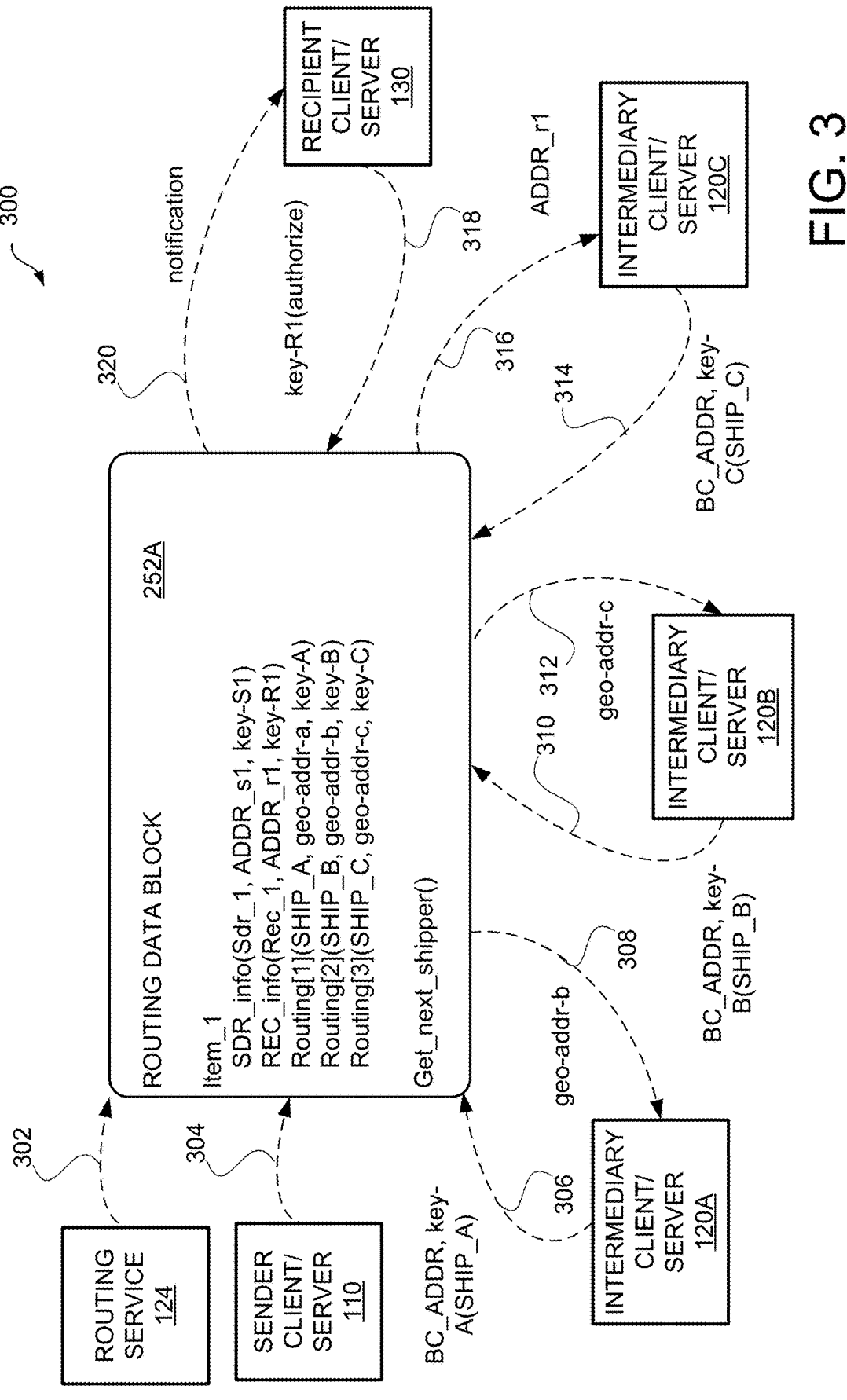
FIG. 3 is a functional block diagram showing an illustrative example of an architecture and data flow for managing package shipment involving multiple shipping entities utilizing routing information on a blockchain.

FIG. 3 is a functional block diagram showing an illustrative example of an architecture and data flow 300 for managing package shipment involving multiple shipping entities utilizing routing information stored on a blockchain in the context of the example of FIG. 2C. In this example, sender entity using sender client/server 110, at 302, or another trusted entity using routing service 124, at 304, has defined a shipping route for shipping an item and stored the shipping information for the item in routing information blockchain 140. The sender has attached a tag, such as a shipping tag or other identification technology, e.g. RFID, to the item that can provide, either directly or indirectly, the blockchain address BC_ADDR for routing data block 252A.

When the first shipping entity SHIP_A picks up the item at the sender's geolocation address, the tag on the item is scanned by client/server 120A to obtain the BC_ADDR for block 252A. At 306, intermediary client/server 120A requests the information for the next shipper in the shipping route, e.g. by invoking the Get_next_shipper(SHIP_A) method. In response, routing data block 252A returns the geolocation address geo-addr-b for the next shipper in the shipping route, SHIP_B.

Note that in this example, key-A is used to cryptographically authenticate SHIP_A or to encrypt the data exchange with routing data block 252A. In one example, a public-private key pair for SHIP_A can be utilized to securely authenticate SHIP_A. In another example, a public-private key pair for SHIP_A can be utilized to encrypt communications with the blockchain platform supporting block 252A. In yet another example, the shipping information, e.g. identifier or geolocation address, for SHIP_B can be encrypted using a public key for SHIP_A when the shipping route was defined, so that SHIP_A can decrypt the information using its private key. Similar security techniques can be implemented for the other entities in a shipping route including the sender and recipient. A wide variety of approaches can be utilized for securely storing and retrieving the shipping information in accordance with aspects of the disclosed technology.

When the item arrives at the second intermediate shipper SHIP_B, the tag on the item is again scanned using client/server 120B to obtain blockchain address BC_ADDR for block 252A. At 310, intermediary client/server 120B invokes Get_next_shipper(SHIP_B) in routing data block 252A, which returns, at 312, the next shipping address geo-addr-c for SHIP_C.

When the item arrives at the third intermediate shipper SHIP_C, the tag on the item is once again scanned using client/server 120C to obtain blockchain address BC_ADDR for block 252A. At 310, client/server 120C invokes Get_next_shipper(SHIP_C) is invoked in routing data block 252A to obtain the next shipping information, which, in this example, is the shipping information for the recipient. At 316, the recipient's geolocation address ADDR_r1 is returned to SHIP_C, However, in this example, in response to the request from client/server 120C at 314, routing data block 252A is configured to generate a notification to the recipient to obtain authorization to release the recipient's shipping information, e.g. name and address. For example, routing data block 252A can include a Notify( ) function that is invoked to send an arrival notification message, at 320, to recipient client/server 130.

Recipient client/server 130 responds to the arrival notification, at 318, with an authorization to release the recipient shipping information. In one example, recipient client/server 130 can provide an alternative geolocation address for delivery, e.g. a work address, in the response at 318, which is provided in the response at 316 to intermediary client/server 120C. In either case, SHIP_C can use the shipping information returned at 316 to deliver the item to the recipient.

As discussed above, in some examples, physical status data regarding the item can be included when the intermediary client/servers 120 invoke Get_next_shipper( ) The Get_next_shipper( ) method can be configured to store the physical status data, such as in a physical data repository or in a side chain on a blockchain.

A technical advantage of the disclosed technology is that the routing information can be securely and immutably stored in a blockchain and backed by the multisignature cryptographic signature methods currently used by blockchain frameworks to ensure that routing information is secure. Another advantage is that the routing information can be widely distributed and made easily accessible using a blockchain address for a routing data block with the routing information.

In some examples, modifications of routing information can be stored in the blockchain by creating and linking additional routing data blocks for the item. When routing information is obtained from the blockchain, only the latest routing information for an item is used for routing. A technical advantage of this approach is that the routing information for an item can be modified by adding routing data blocks to the routing information blockchain. The blockchain address from the shipping tag can remain unchanged. Therefore, the shipping tag does not need to be replaced or reissued to modify the routing information.

It will be readily appreciated that the disclosed technology enables complex and sophisticated routing information to be defined for items. Many variations can be implemented that differ from the examples illustrated or go beyond the examples illustrated.

The routing information illustrated above can be defined and determined in a variety of ways. For example, a seller user with administrative permissions can define the routing information for an item and create the routing data blocks on a blockchain. In another example, a seller can provide the sender client/server the routing information and the sender client/server can manage the routing data block on the blockchain. In yet another example, the routing information can be provided to routing service 124, which creates and manages the routing data block on the blockchain.

FIG. 4A is a control flow diagram showing an illustrative example of a process 400, such as a process in sender client/server 110 or routing service 124, that is consistent with the examples of FIGS. 2A-D and 3. In this example, routing information is defined and distributed on a routing information blockchain for use in managing package shipment involving multiple shipping entities utilizing routing information on a blockchain in accordance with certain aspects of the disclosed technology.

At 402, shipping information for a sender and a recipient for an item is received, such as is described above with respect to UI 262 in FIG. 2D or in other ways as are suitable for a particular implementation. The shipping information can include an identifier for the item (e.g. a serial number or transaction number), identifiers for the sender and recipient (e.g. name), geolocation (e.g. a street address), and a key for authentication or encryption. In addition, as noted above, additional shipping requirements can be received, such as delivery time requirements, pricing, environmental requirements, or other special handling requirements.

At 404, using the shipping information received, one or more shipping route options are obtained for shipping the item from the sender to the recipient, e.g. from the sender's geolocation to the recipient's geolocation received above. For example, the shipping route options can be developed by, for example, process 420 in FIG. 4B executing in sender device 110 or routing service 124, e.g. a web service, that searches or collects shipper information regarding shippers and from shippers. The shipping route options can include supporting data, such as routes, pricing, shipper identifier, shipper reputation data, availability, time to delivery, etc.

At 406, one or more of the shipping route options obtained at 404 are provided for display, e.g. UI screen 264 in FIG. 2D. Note that some of the supporting data can be provided for display in response to a request for additional data, e.g. activating UI screen 266 in FIG. 2D.

At 408, a selection of a shipping route option is received, e.g. a sender makes a selection using UI screen 264 or 266. Responsive to the shipping route selection, at 410, a routing data block or contract, such as block 252A in FIG. 2C, is created on a routing information blockchain with the shipping route information, e.g. a name and geolocation for the sender, the recipient, and each intermediate shipper in the selected shipping route.

At 412, a shipping tag is encoded with the blockchain address of the routing data block created at 410. The shipping tag can utilize many different technologies provided that the shipping tag either directly, e.g. includes the blockchain address itself, or indirectly, e.g. includes a pointer to data for the blockchain address, provides the blockchain address. For example, the shipping tag can be a printed shipping tag with the blockchain address encoded in a bar code on the tag. In another example, the shipping tag can be an RFID device encoded with the blockchain address or a pointer to the blockchain address. The tag can be attached or affixed to the item or packaging for the item.

Figure 4B:
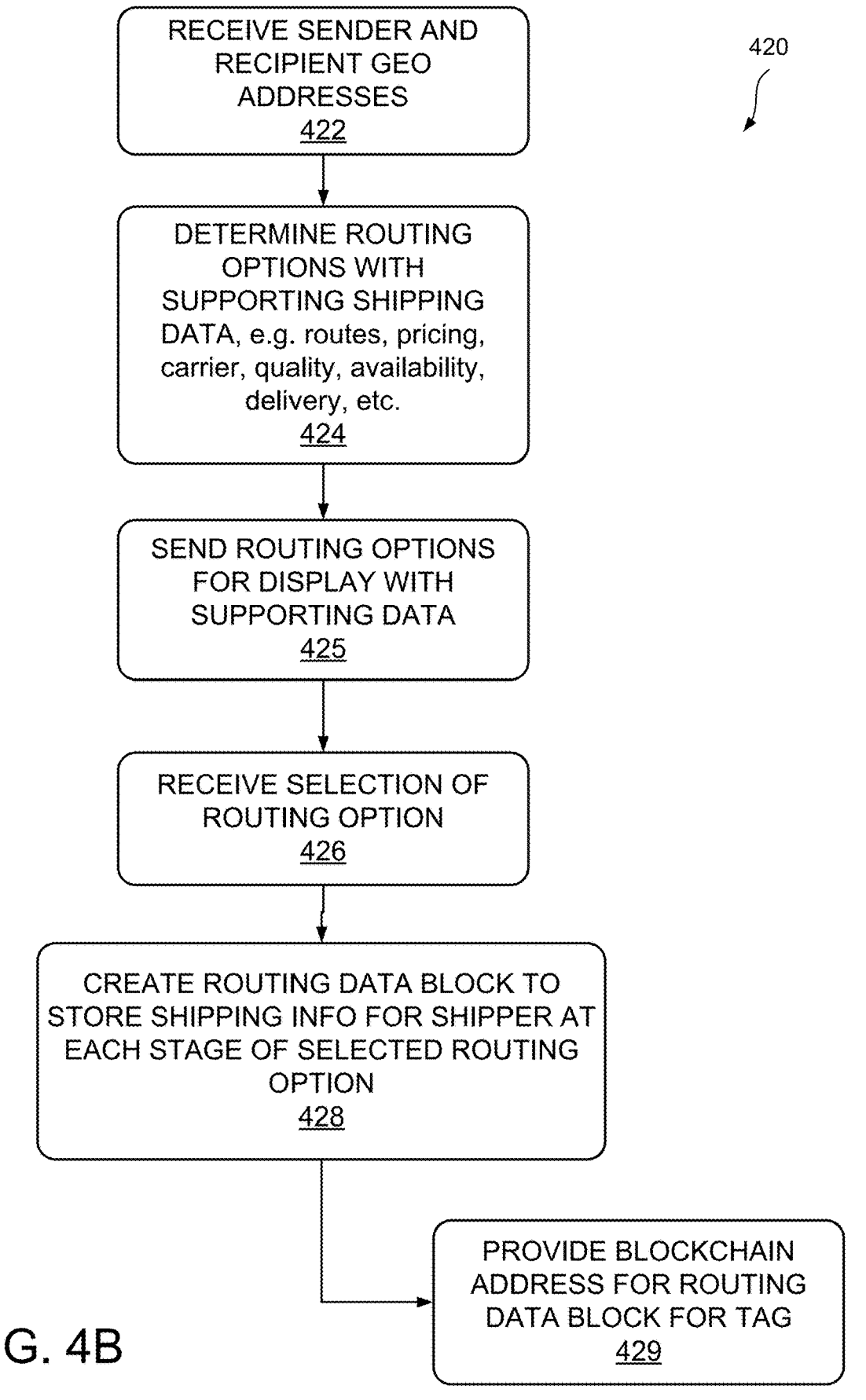
FIG. 4B is a control flow diagram showing an illustrative example of a process for an intermediate shipper in a shipping chain that is consistent with the example of FIG. 3 to obtain routing information from a blockchain.

FIG. 4B is a control flow diagram showing an illustrative example of a process 410, such as a process in sender device 110 or routing service 124 for determining routing options for a sender. For example, process 410 may execute in routing service 124 based on information received from sender device 110 and the routing options determined by the process can be sent to sender device 110 for display to a sender.

At 422, the sender and recipient shipping information is received, e.g. the names and address defined by a sender using UI screen 262. In some examples, an identifier an entity can be provided and a geolocation for the entity derived from identifier, e.g. a name for the sender is used to determine a street address for the sender.

At 424, based on the sender and recipient addresses, one or more routing options are determined along with supporting shipping data, such as routes, pricing, carriers, quality, availability, and delivery schedule. The shipping route options can be developed by, for example, a process in sender device 110 or routing service 124, e.g. a web service, that searches or collects shipper information regarding shippers and from shippers (e.g. availability, routes, cost, quality, etc.).

For example, one or more shippers can provide data regarding their routes, availability, times, and cost. Other information, such as shipper reputation, may be provided by another service or maintained in a database, e.g. routing service 124 can accumulate and maintain reputation data for shippers.

Using the shipper information, an algorithm may identify a set of possible shipping routes from the sender's geolocation to the recipient's geolocation. In further examples, the algorithm may apply additional criteria obtained from the sender to remove the shipping routes that do not meet the criteria.

At 425, one or more routing options developed at 424 are sent for display along with supporting data. For example, routing service 124 can develop the routing options and send the information for the routing options to sender client/server 110 for display to a sender, e.g. via UI screen 264. For example, the routing options can be sent from one device to another in a message or can be transferred from one service to another on the same execution platform.

In some examples, such as implementations wherein routing service 124 creates and manages routing data blocks on a blockchain, a selection of a routing option is received, at 426, such as a sender selection using UI screen 264 or 266 in UI 260 that is sent to routing service 124. Responsive to receiving the selection at 426, at 428, a routing data block is created, e.g. by routing service 124, to store the shipping information for each stage of the selected routing option. At 429, the blockchain address for the routing data block created at 428 is provided, e.g. by routing service 124, for use in encoding a shipping tag, e.g. the blockchain address is sent to sender client/server 110 to print a shipping label or encode an RFID device with the blockchain address.

Figure 4C:
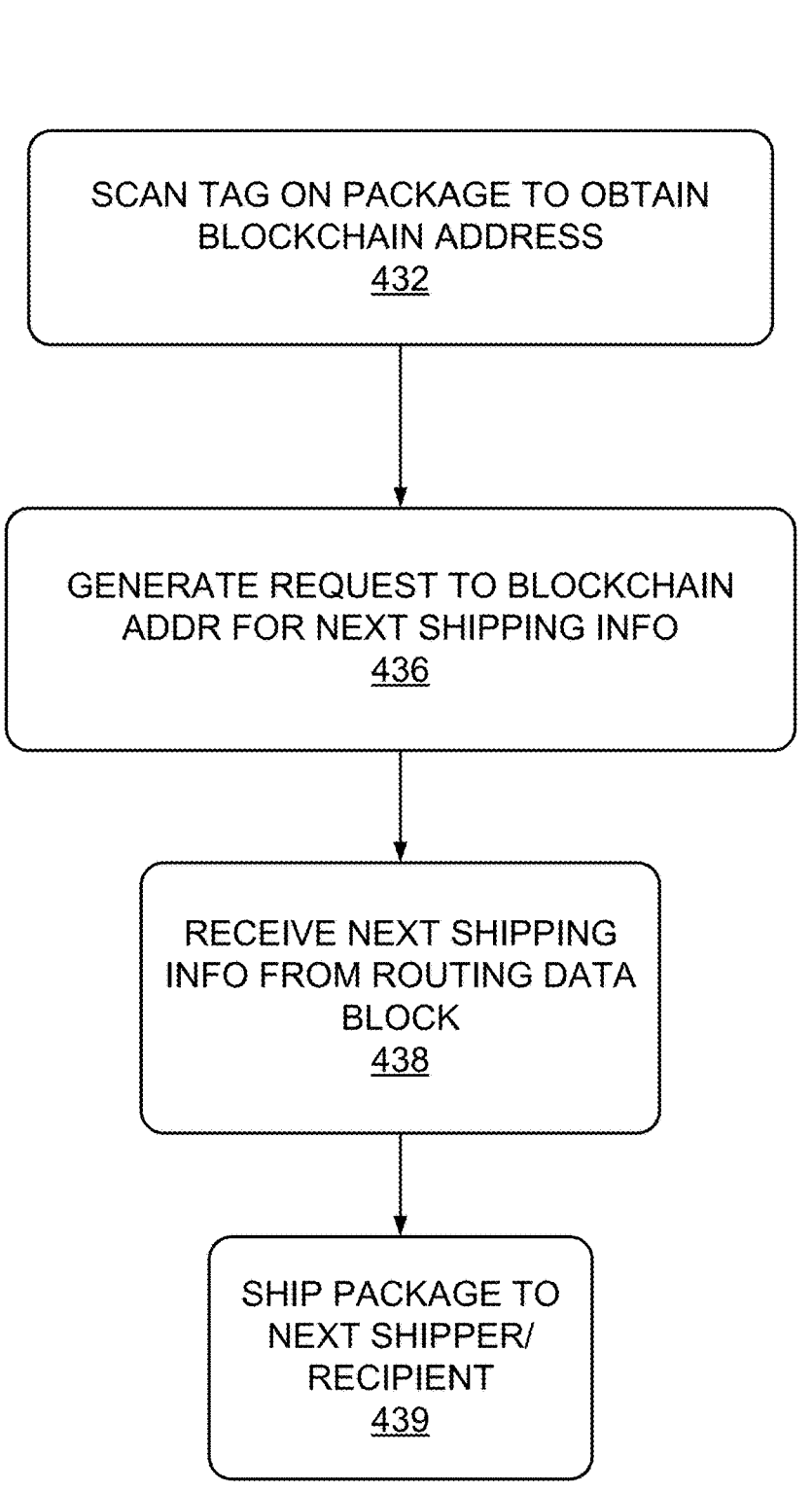
FIG. 4C is a control flow diagram showing an illustrative example of a process executing in a blockchain platform that is consistent with the example of FIG. 3 for managing package shipment involving multiple shipping entities utilizing routing information on a blockchain.

FIG. 4C is a control flow diagram illustrating an example of a process 430, such as a process in intermediate shipper client/servers 120 in FIG. 3 for obtaining the next shipper or destination information in a shipping route for an item. At 422, a tag attached or affixed to a received item is scanned to obtain a blockchain address to a routing data block for the item.

At 436, a request for the next shipper information for the selected routing option in the routing data block is generated. In some examples, the request can be an invocation of a method, e.g. Get_next_shipper ( ) in the routing data block

252A. In other examples, the request can be a message, such as a message sent to an entity in a blockchain platform supporting the routing data block. As discussed above, the shipping entity making the request can be authenticated using a cryptographic key, communications involving the shipping entity can be encrypted using the key, or data in the routing data block can be encrypted using the key.

At 438, the next shipper information is received, e.g. returned by Get_next_shipper( ) in the routing data block. The next shipping information can be an identifier or a geolocation address for an intermediate shipper in the shipping route or the recipient's shipping information, e.g. name and street address. At 439, the item or package is shipped, transferred or otherwise delivered to a geolocation based on the next shipping information.

Figure 4D:
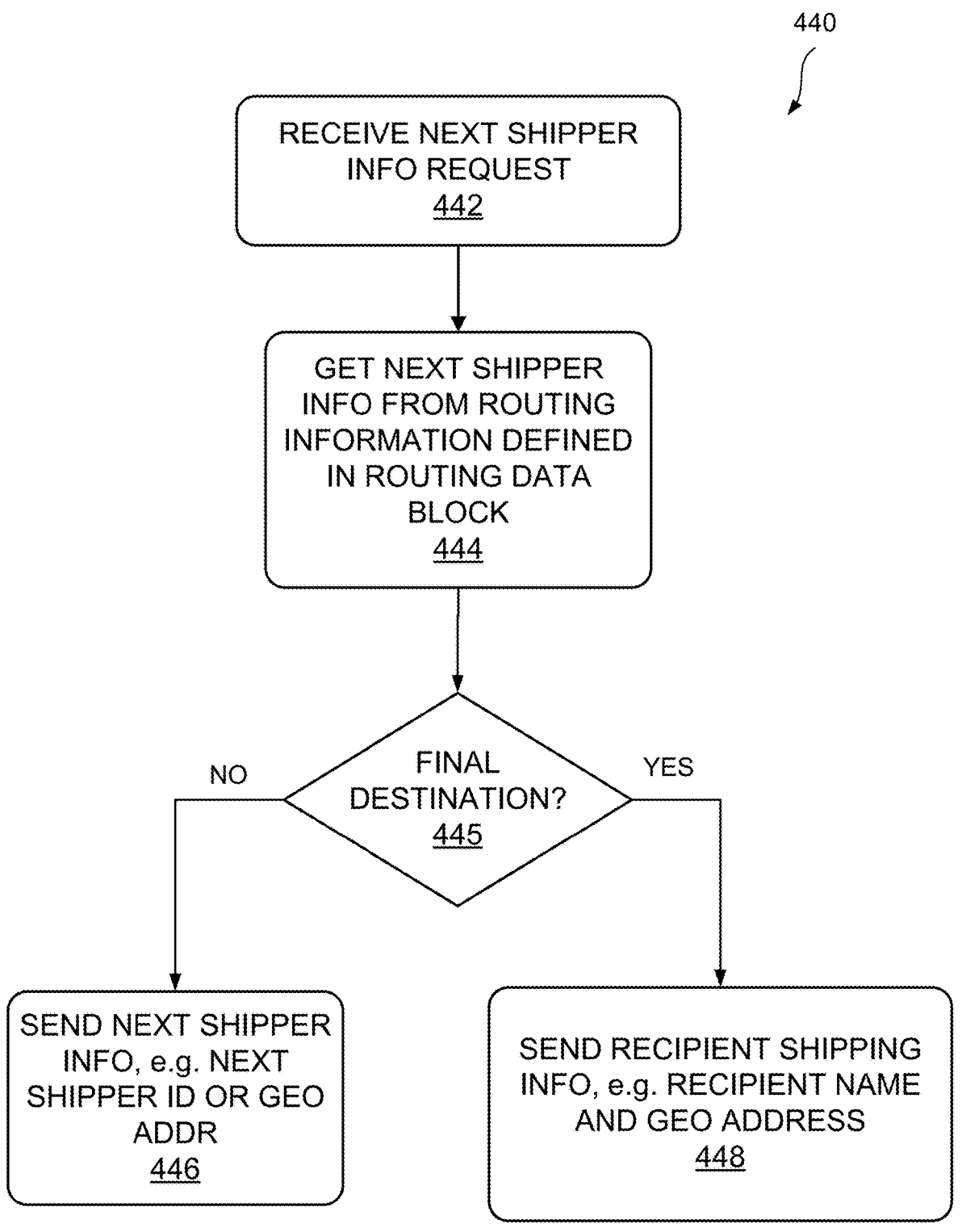
FIG. 4D is a control flow diagram showing an illustrative example of a process for a sender to initiate shipping that is consistent with the example of FIG. 3B for managing package shipment involving multiple shipping entities utilizing routing information on a blockchain.

FIG. 4D is a control flow diagram showing one illustrative example of a process 440 executing in a blockchain platform, such as blockchain platform 160, that is consistent with the example of FIGS. 2B and 3 for managing package shipment involving multiple shipping entities utilizing routing information on a blockchain in accordance with certain aspects of the disclosed technology.

At 442, a request for the next shipper information is received, e.g. the Get_next_shipper( ) is invoked. At 444, the next shipper information, e.g. name and geolocation, is obtained from the routing information in the routing data block at a blockchain address from a tag on the item or package.

In this example, at 445, a determination is made as to whether the next leg of the shipping route is the final destination, e.g. there are no more intermediate shippers defined in the Routing[n] array in the routing data block. If it is determined that the next destination is not the final destination, then control branches to 446 to send the next shipper info, e.g. the name or street address for the next shipper in the shipping route defined in the Routing[n] array. If it is determined that the next destination is the final destination, then control branches to 448 to send the recipient's shipping information, e.g. name and street address.

Note that in some implementations, the recipient provides an authorization to release the recipient's shipping information. In further examples, the recipient can provide an alternative geolocation for delivery of the item.

In particular examples involving dynamic routing of an item, the next shipping information can be determined during shipment of the item. FIG. 4E is an illustrative example of a process 450 implemented in a variation on the routing data blocks discussed above or a process in sender client/server 110 or routing service 124 for dynamically processing a next address request from an intermediate shipper, where a sender is enabled to make a determination as to the next shipping option at each stage of a shipping route.

In this example, a routing process can be provided for dynamically processing a next address request from a shipper, where a sender is enabled to make a determination as to the next shipping option at each stage of a shipping route. For example, each stage of the shipping route can be rebid at time of transfer so that the shipping route can be determined at each stage of shipping based on the then currently offered bid pricing and scheduling options for the next stage of shipping.

At 452, a request for the next shipper information is received, e.g. method in a routing data block is invoked or a request message received. At 454, a determination is made as to whether the next stage of the shipping route is the final destination. If it is determined that the next stage is the final destination, then control branches to 456 to send the recipient's shipping information, e.g. name and street address, in response to the request.

If it is determined that the next stage is not the final destination, then control branches at 454 to 460 to determine the shipping options for the next shipping stage based on current conditions. For example, routing option information regarding one or more shipper's bid pricing, availability, time to pickup or deliver, vicinity to the geolocation of the item, can be developed at 460. For example, an available shipper at a distance from the item's geolocation that is within a vicinity threshold can be identified as a routing option. In another example, a shipper with availability at the time of the request can offer a discounted bid price for a routing option.

At 462, the routing option information based on current conditions developed at 460 is provided for display, e.g. to a sender through a UI similar to UI 260 shown in FIG. 2D operating on sender client/server 110. At 464, a At 464, a selection of a routing option for the next shipping stage is received. At 466, the selected routing option, e.g. the next shipper's shipping information is recorded, such as in a new routing data block for the item in a routing information blockchain, where the new routing data block is linked to the previous routing data block for the item. At 468, the shipping information for the selected routing option is provided in response to the request for the next shipping information at 452.

In other examples involving dynamic routing of an item, the next shipping information can be determined during shipment of the item based on current physical shipping conditions, such as weather, temperature, humidity, damage, current duration of shipping, anticipated time to delivery, equipment status (e.g. malfunction or unavailable). FIG. 4F is an illustrative example of a process 470 implemented in a variation on the routing data blocks discussed above or a process in sender client/server 110 or routing service 124 for dynamically processing a next address request from an intermediate shipper, where a sender is enabled to make a determination as to the next shipping option at each stage of a shipping route based on current physical conditions.

In this example, current physical conditions, such as weather conditions, equipment availability, pricing, delivery time, time in transit, physical condition of item, time that the item has been above a threshold temperature or humidity, etc., can determine the next stage of the shipping route.

In one example, a storm that grounds an air shipper can result in an alternative shipping option for a surface shipper to be used for the next stage of shipping. In another example, a drop-in price for shipping on one or more stages of the shipping route can result in a lower price shipping option being used for the next shipping option. In still another example, a delay in shipping can result in a faster shipping option being utilized to deliver a package by its delivery due date. In yet another example, availability of suitable equipment, e.g. a refrigerated container, can be considered in the next stage of shipping. In still another example, if the item has been too long in transit or has been subjected to excessive heat or moisture, then a return shipment can be considered in the next stage of shipping.

In general terms, in this example, when an address request is received from a shipper, the current shipping conditions are checked to determine whether an alternate route should be considered. If it is determined that no reroute will be taken, then the next shipper info in the original shipping route is sent to the requesting shipper. However, if the physical conditions indicate a reroute, then an alternative route can be determined based on the conditions. The conditions and alternate route determinations can be driven by predetermined rules, such as meeting delivery deadlines, selecting more reliable shipping options based on weather, or similar considerations.

At 472, a request for the next shipper information is received, e.g. A method in a routing data block is invoked or a request message received. At 474, current physical shipping conditions, such as weather, equipment, pricing, availability or time to delivery, are checked to determine whether the item should be rerouted. If it is determined that no reroute is indicated under current physical conditions, control branches at 476 to 478 to send the next shipper information from the routing data block in response to the request.

However, if it is determined that a reroute is indicated under current physical conditions, control branches at 476 to 480 to determine alternate routes based on current physical conditions. This determination can be algorithmically determined without sender input or alternate route options can be provided to a sender for selection. If an alternate route is determined or selected, at 482, the alternate route is recorded in the routing information blockchain, e.g. a new routing data block is created and linked to the previous routing data block for the item. At 484, the shipping information for the next shipper in the alternate shipping route is determined and, at 488, the shipping information is provided in response to the request for next shipper information.

Note that in some implementations, a shipper identifier may be used in place of a geolocation address so that the item can be delivered to a nearby location associated with the shipper identifier, e.g. a local facility for a national carrier.

The examples of FIGS. 4A-F illustrate a variety of approaches to controlling and distributing routing information for use in shipping an item or package in accordance with certain aspects of the disclosed technology. It will be readily understood that other approaches can be utilized in accordance with the disclosed technology. Note that the disclosed technology can be implemented in varying ways to suit a particular implementation or design without departing from the teachings of the disclosed technology.

Figure 4G:
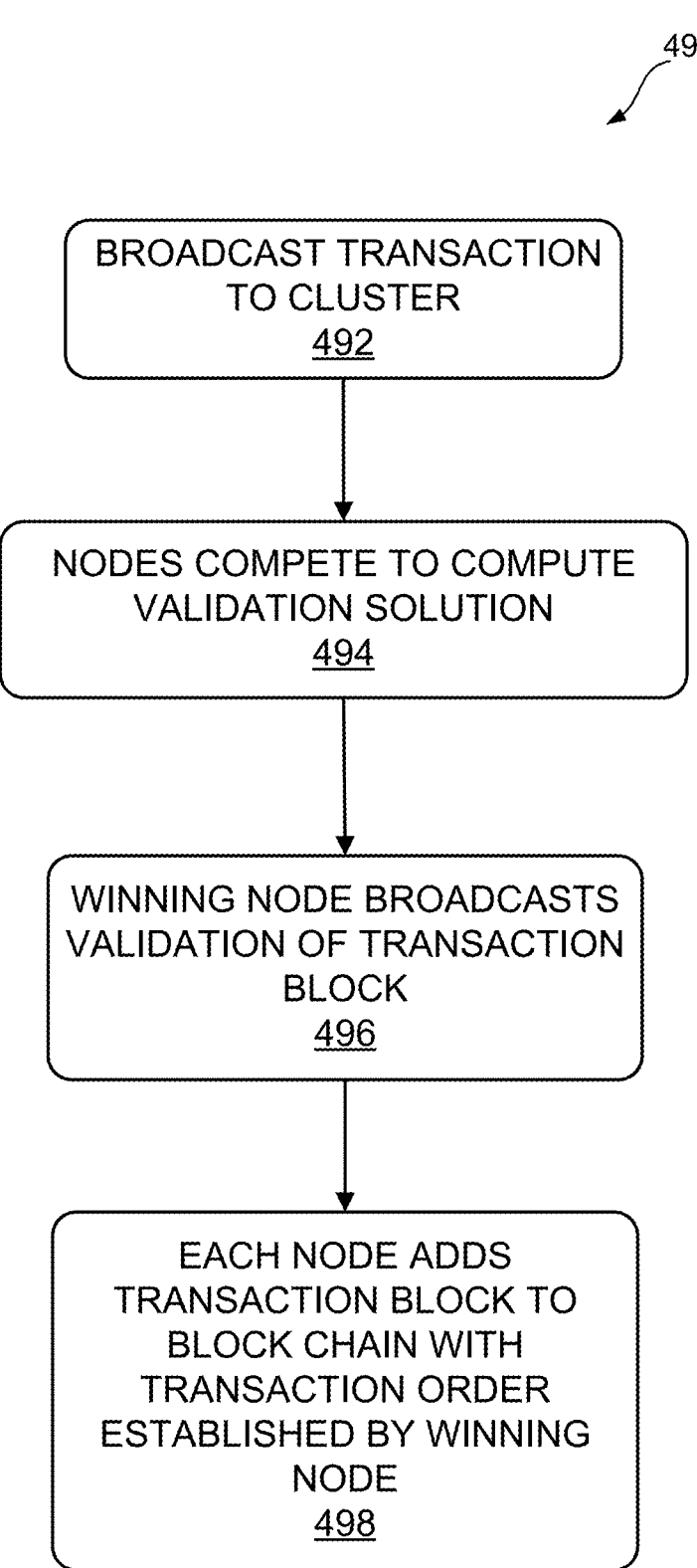
FIG. 4G is a control flow diagram illustrating an example of a validation process for blocks added to the routing data blockchain distributed to untrusted nodes.

FIG. 4G is a control flow diagram illustrating an example of a validation process 490 for blocks added to the routing information blockchain ledger 140 of FIG. 1 or ledger 200 of FIG. 2A implemented using untrusted blockchain nodes. In process 490, when a routing data block 142 is created for routing information blockchain 140, the transaction is broadcast, at 492, to the cluster of untrusted nodes. At 494, nodes compete to compute a validation solution for the transaction. At 496, a winning node broadcasts the validation solution for the routing data block or access control rule block and adds the data block to its copy of the corresponding data blockchain ledger, e.g. routing information blockchain 140 in FIG. 1.

At 498, in response to the winning node's broadcast, the other nodes add the routing data block or access control rule block to their copy of the routing information blockchain ledger in the transaction order established by the winning node. The decentralized validation protocol can maintain the integrity, immutability and security of the routing data blockchain ledger.

It should be appreciated that the processes shown above are examples and a variety of other approaches may be utilized without departing from the disclosed technology.

Depending upon the scripting capabilities of the blockchain platform, the methods or function in the data blocks of the routing data blockchain may include more extensive code execution. For example, a routing information system that provides for shared access to the routing information by multiple users may involve more extensive code execution capability in the blockchain than a routing information system that limits access to a single user, such as sender client/server 110 or routing service 124. Such a routing information system may involve routing information being stored using routing data blocks that include executable methods that control access to the routing information or modification of the routing information.

It should be appreciated that the utilization of managing package shipment involving multiple shipping entities utilizing routing information on a blockchain in accordance with certain aspects of the disclosed technology can provide a high degree of flexibility, complexity and variation in the configuration of implementations without departing from the teaching of the disclosed technology.

Figure 5:
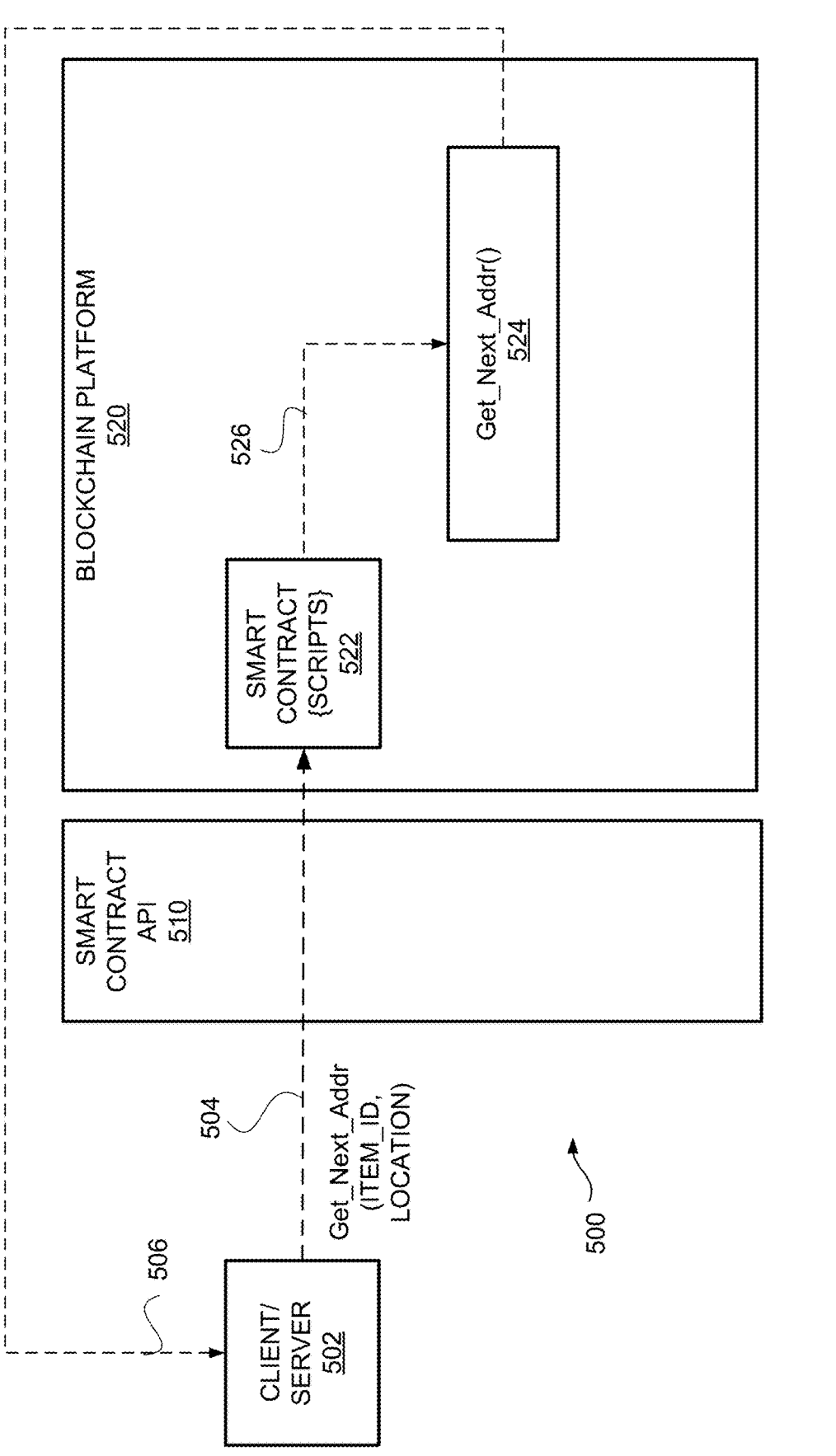
FIG. 5 is a data architecture diagram showing an illustrative example of a user using an application programming interface to invoke a method in a routing data block on a routing information blockchain.

FIG. 5 is a data architecture diagram showing an illustrative example of an interface for accessing routing information in routing information blockchain on a blockchain platform, such as the routing data blocks in FIGS. 1, 2A-D and 3. In this example, an Application Program Interface (API) 510 provides an interface to the blockchain platform 520 that supports the routing information blockchain. The blockchain platform 520 supports a smart contract 522, such as routing data block 242 in FIG. 2B, which includes a Get_Next_shipper( ) script 524 with code that, when executed by the blockchain platform 520 in response to a request 504 from client/server 502, operates to obtain next shipper routing information for an item that is stored on the routing information blockchain and return the routing information 506 to client/server 502.

Blockchain Ledger Data Structure

Figure 6A:
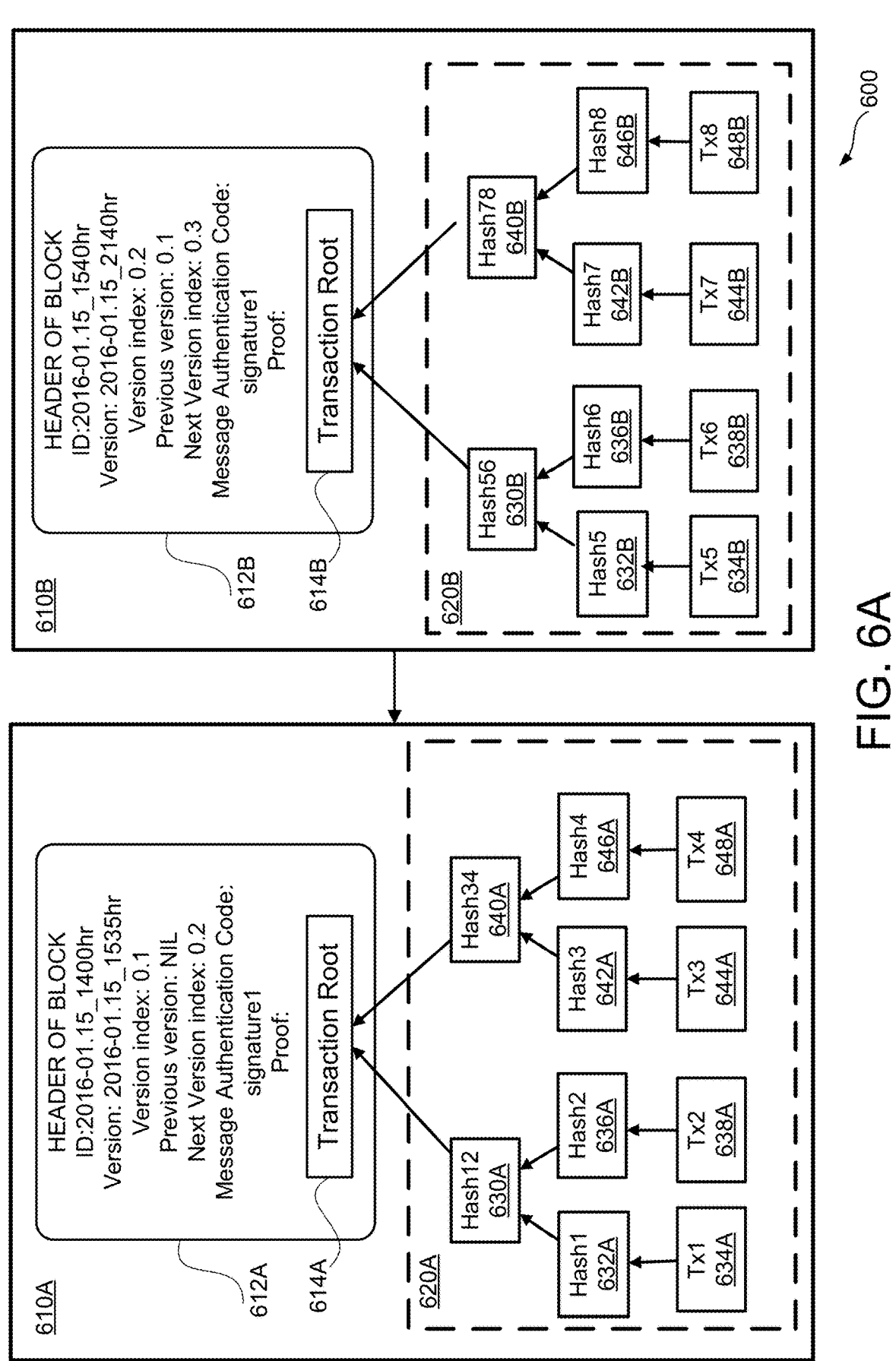
FIG. 6A is a data architecture diagram illustrating a simplified example of a blockchain ledger based on the routing data blocks of the routing information blockchain of FIG. 1.

FIG. 6A is a data architecture diagram illustrating a simplified example of a blockchain ledger 600 based on the blocks 142A-E of the routing data blockchain 140 of FIG. 1. The blockchain ledger 600 example of FIG. 6A is simplified to show block headers, metadata and signatures of blocks 142A-E in order to demonstrate a routing information ledger using a blockchain. In outline, a blockchain ledger may be a globally shared transactional database.

FIG. 6A is an illustrative example of a blockchain ledger 600 with a data tree holding routing information that is verified using cryptographic techniques. In FIG. 6A, each block 610 includes a block header 612 with information regarding previous and subsequent blocks and stores a transaction root node 614 to a data tree 620 holding transactional data. Routing information may store smart contracts, data related to transactions, or any other data. The elements of smart contracts may also be stored within transaction nodes of the blocks.

In the example of FIG. 6A, a Merkle tree 620 is used to cryptographically secure the routing information. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
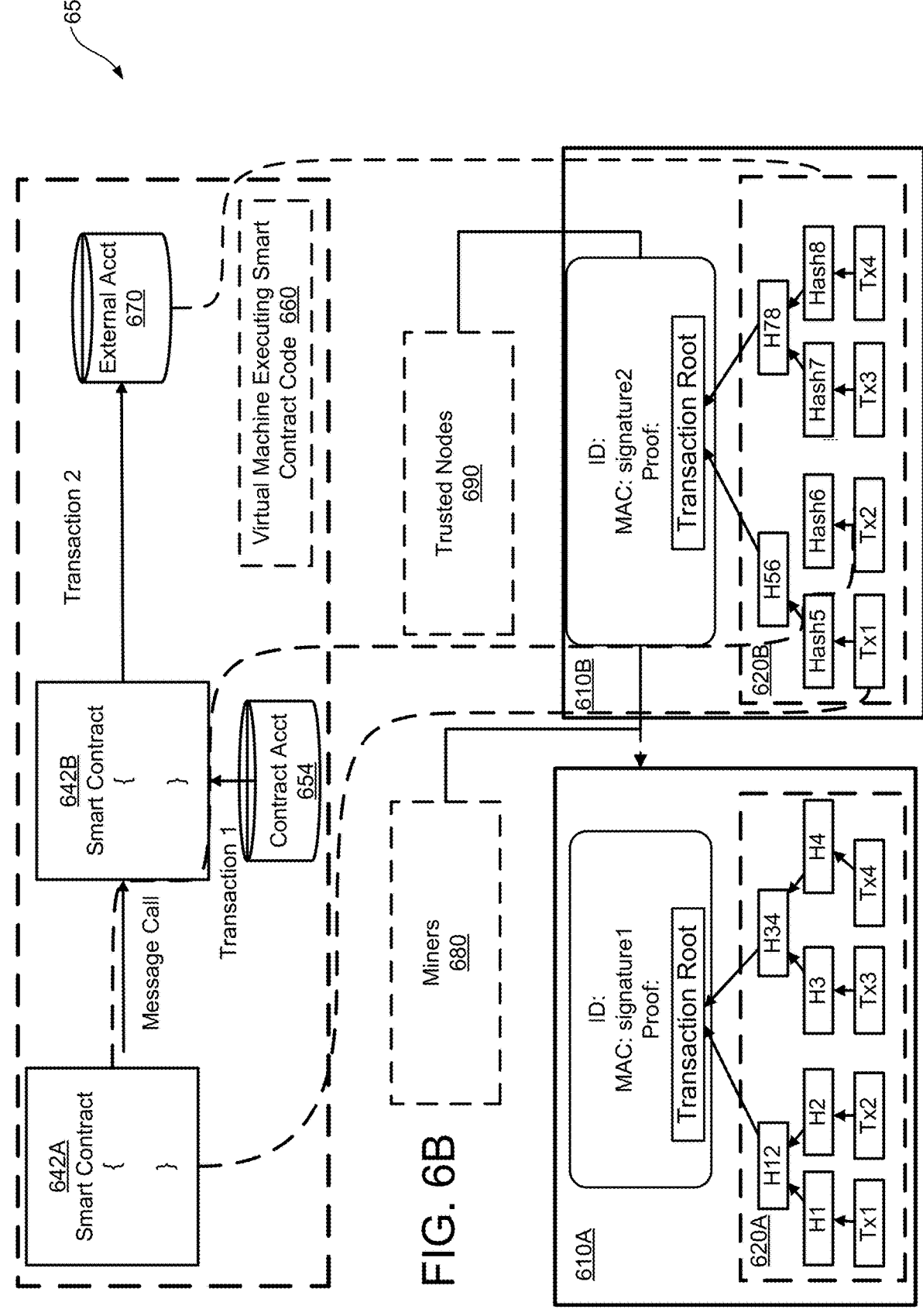
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in routing information nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Routing Information in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates routing information, the routing information must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as sender client/server 110 or routing service 124, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a routing data block 142 for routing data blockchain 140, the block is an unconfirmed and unidentified entity. To be part of the acknowledged "currency", it may be added to the blockchain, and therefore relates to the concept of a trusted cluster.

In a trusted cluster, when a data block 142 is added, every node competes to acknowledge the next "transaction" (e.g. a new routing information or access control rule block). In one example, the nodes compete to mine and get the lowest hash value: min {previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

The mining process, such as may be used in concert with the validation process 490 of FIG. 4G, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 492, to the network using software. Mining nodes compete, at 494, to compute a validation solution to validate transactions, and then broadcast, at 496, the completed block validation to other nodes. Each node adds the block, at 498, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the routing information blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource and access control rule on a blockchain can be restricted by cryptographic means to be only open to authorized servers. Since the routing information or routing information blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving routing information blockchain ledger. The specific examples of different aspects of routing information blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, routing information executed and generated by smart contracts may be stored in the blockchain ledger in the ways previously described.

Computer Architectures for Use of Smart Contracts and Blockchain Ledgers

Figure 8:
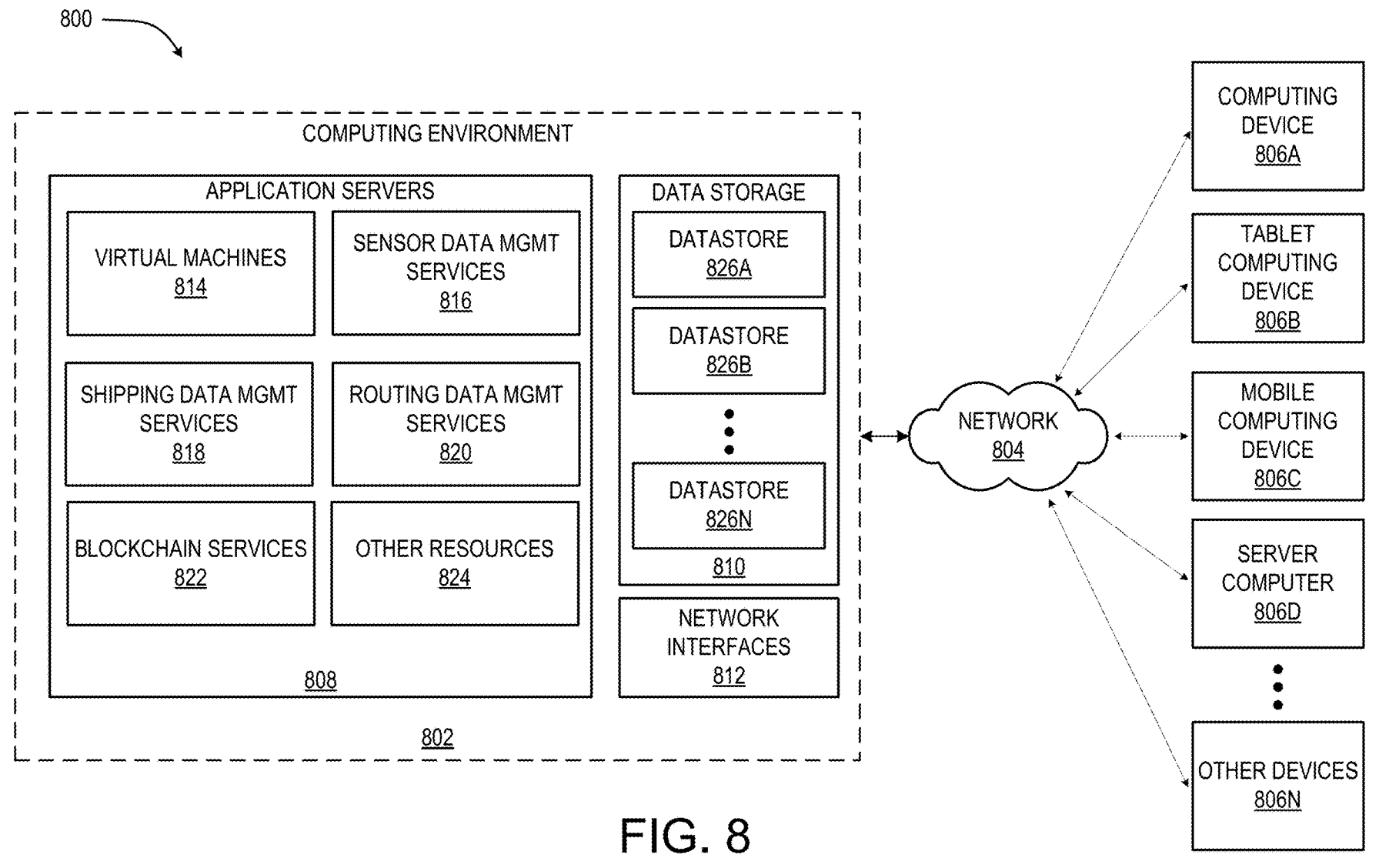

Note that at least parts of processes of FIGS. 4A-G, smart contract 522 of FIG. 5, smart contracts 642 of FIG. 6B, and other processes and operations pertaining to routing information blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the routing information blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes of FIGS. 4A-G, smart contract 522 of FIG. 5, smart contracts 642 of FIG. 6B) are described herein as being implemented, at least in part, by an application, component, and/or circuit. Although the following illustration refers to the components of FIGS. 4A-G, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes of FIGS. 4A-G, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
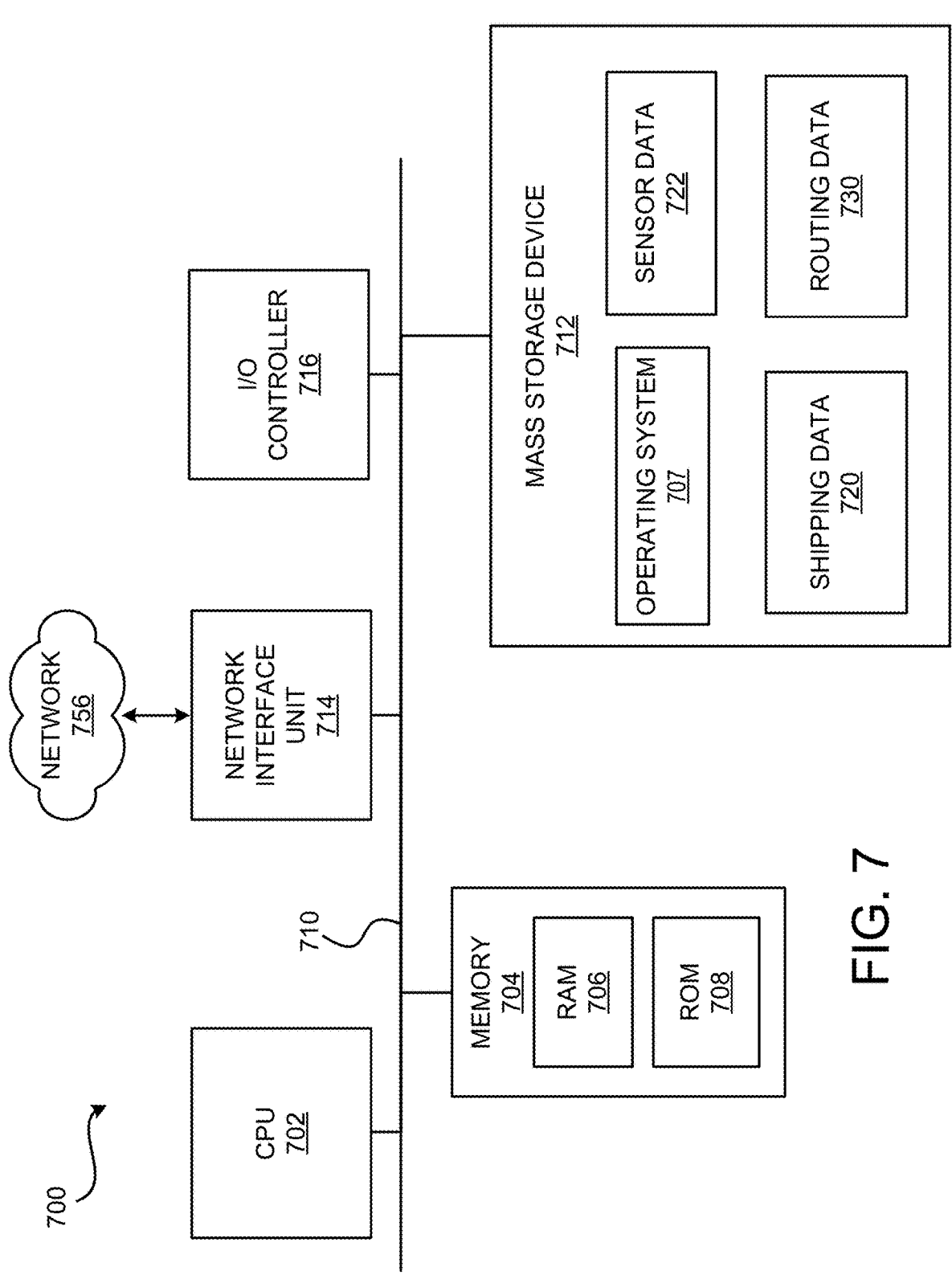
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110, 120A-C and 124 (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as shipping data 720, sensor data 722, and a copy of routing information block-chain data 730), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for system level authentication utilizing service permissions bound to an item or package for a blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 856, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

The application servers 808 can also host routing information data management services module 820, such as those described with respect to sender client/server 110 or routing service 124 of FIGS. 1 and 3. Routing information data management services module 820 can obtain routing information from the routing information blockchain responsive to requests from entities executing in virtual machines 814. Sensor data management services module 816 may collect sensor data relating to physical conditions of an item or package or shipping infrastructure. Shipping data management services module 818 may collect shipper information, such as a shipper's routes, availability, infrastructure and reputational data. According to various implementations, the application servers 808 also include one or more, and blockchain services 822.

The routing information management services 820 can include services for managing routing information on a routing information blockchain, such as routing information blockchain 140 in FIG. 1. The blockchain services 822 can include services for participating in management of one or more blockchains, such as by creating genesis blocks or routing data blocks, and performing validation.

As shown in FIG. 8, the application servers 808 also can host other services, applications, portals, and/or other resources ("other resources") 824. The other resources 824 can include, but are not limited to, authentication, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for routing information blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting routing information blockchain ledger, among other aspects.

Figure 9:
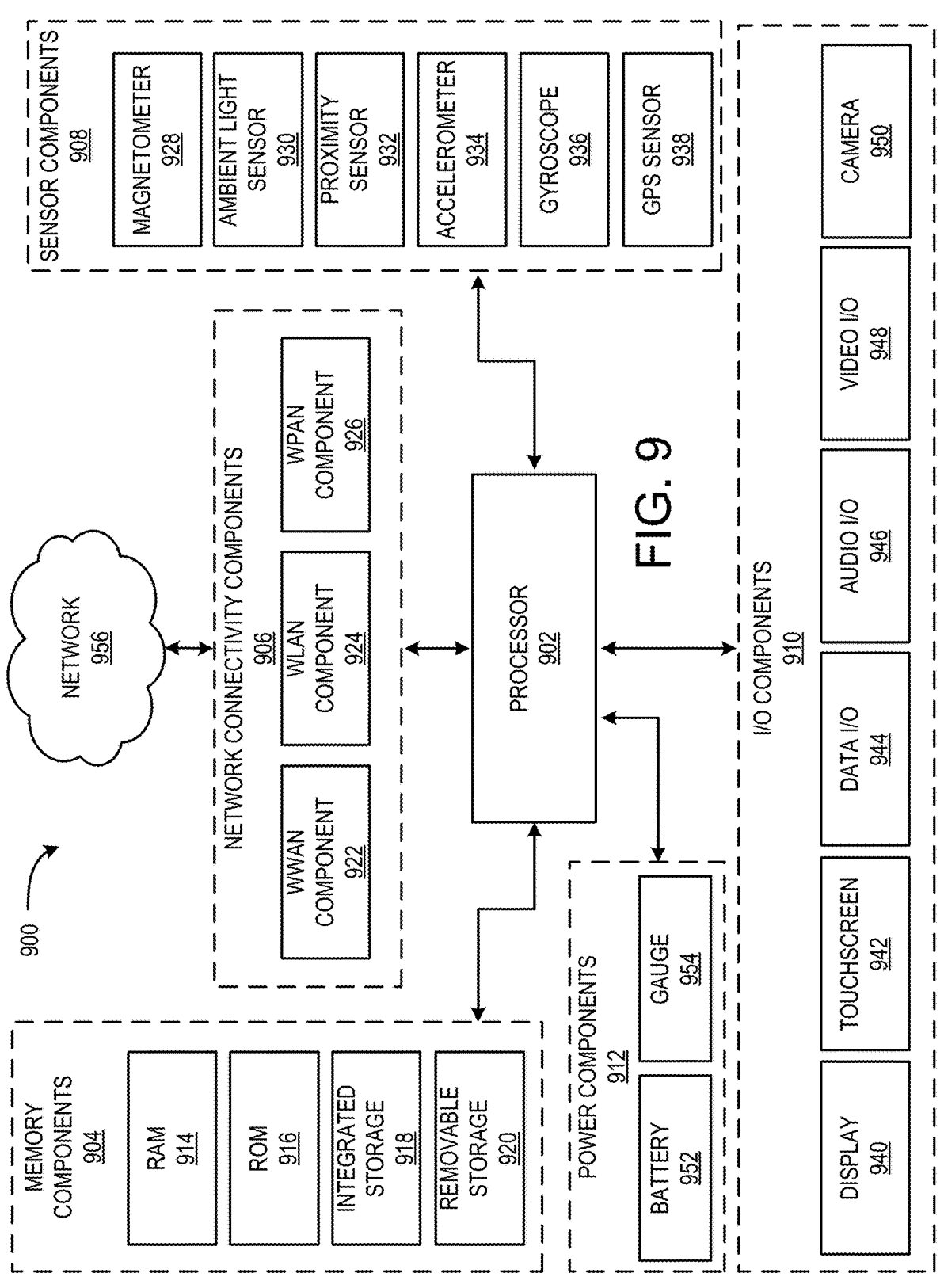
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for supporting a blockchain ledger and applying routing information to the blockchain ledger. The computing device architecture 900 is applicable to computing devices that can manage a blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the Sender client/server

110, client/servers 120A-C, routing service 124, recipient client/server 130, and blockchain platform 160 shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("POP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, Com-pactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington. The operating system may also include WINDOWS MOBILE OS from Microsoft Corpo-ration of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Moun-tain View, California. Other operating systems are contem-plated.

The network connectivity components 906 include a wireless wide area network component ("WWAN compo-nent") 922, a wireless local area network component ("WLAN component") 924, and a wireless personal area network component ("WPAN component") 926. The net-work connectivity components 906 facilitate communica-tions to and from the network 956 or another network, which may be a WWAN, a WLAN, or a WPAN. Although only the network 956 is illustrated, the network connectivity com-ponents 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technolo-gies can include, but are not limited to, Global System for Mobile communications ("GSM"), Code Division Multiple Access ("CDMA") ONE, CDMA7000, Universal Mobile Telecommunications System ("UMTS"), Long Term Evo-lution ("LTE"), and Worldwide Interoperability for Micro-wave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The net-work 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-com-patible technologies (i.e., incapable of being supported by a single WWAN component). The WWAN component 922 may facilitate similar connectivity to multiple networks (e.g., a UMTS network and an LTE network).

The network 956 may be a WLAN operating in accor-dance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configu-rations, the WLAN is implemented utilizing one or more wireless WI-FI access points. In some configurations, one or more of the wireless WI-FI access points are another com-puting device with connectivity to a WWAN that are func-tioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method for shipping route selection, the method comprising: receiving sender shipping information and recipient shipping information for an item to be shipped; obtaining one or more shipping route options for the item based on the sender shipping information and recipient shipping operation; providing the one or more shipping route options for display; receiving a selection of one of the shipping route options as a selected shipping route option; creating a routing data block for the item on a blockchain, the routing data block having a blockchain address and the routing data block including shipping information for each stage of the selected shipping route; and encoding a shipping tag with the blockchain address of the routing data block for the item.

Clause 2. The method of Clause 1, where the shipping tag comprises one of a shipping label and an electronic device for attachment to the item and the method includes attaching the shipping tag to the item.

Clause 3. The method of Clause 1, further comprising: scanning the shipping tag to obtain the blockchain address for the routing data block; generating a request for next shipping information for a next stage of the selected shipping route from the routing data block using the blockchain address from the shipping tag; receiving the next shipping information from the routing data block; and shipping the item to a geolocation based on the next shipping information.

Clause 4. The method of Clause 3, where the next shipping information comprises at least one of an identifier for a next shipper and a geolocation address for the next shipper.

Clause 5. The method of Clause 1, wherein: the sender shipping information comprises at least one of an identifier and a geolocation for the sender; the recipient shipping information comprises at least one of an identifier and a geolocation for the recipient; the step of obtaining one or more shipping route options for the item based on the sender shipping information and recipient shipping information includes: receiving the geolocation for the sender and the geolocation for the recipient; determining the one or more shipping route options for the item based on the geolocation for the sender and the geolocation for the recipient; and sending the one or more shipping route options for display.

Clause 6. The method of Clause 5, wherein: the step of determining the one or more shipping route options for the item based on the geolocation for the sender and the geolocation for the recipient comprises: obtaining supporting data relating to one or more shipping entities, and determining the one or more shipping route options for the item based on the geolocation for the sender, the geolocation for the recipient, and the supporting data relating to one or more shipping entities; and the step of sending the one or more shipping route options for display includes: sending at least a portion of the supporting data relating to one or more shipping entities for display.

Clause 7. The method of Clause 6, wherein the supporting data relating to one or more shipping entities includes one or more of shipping route, pricing, availability, time to ship, delivery date, special handling capability, and reputational data.

Clause 8. A system for shipping an item, the system comprising: one or more processors; and one or more memory devices in communication with the one or more processors, the memory devices having computer-readable instructions stored thereupon that, when executed by the processors, cause the processors to perform a method for shipping route selection, the method comprising: receiving sender shipping information and recipient shipping information for an item to be shipped; obtaining one or more shipping route options for the item based on the sender shipping information and recipient shipping operation; providing the one or more shipping route options for display; receiving a selection of one of the shipping route options as a selected shipping route option; creating a routing data block for the item on a blockchain, the routing data block having a blockchain address and the routing data block including shipping information for each stage of the selected shipping route; and encoding a shipping tag with the blockchain address of the routing data block for the item.

Clause 9. The system of Clause 8, wherein: the sender shipping information comprises at least one of an identifier and a geolocation for the sender; the recipient shipping information comprises at least one of an identifier and a geolocation for the recipient; the operation of obtaining one or more shipping route options for the item based on the sender shipping information and recipient shipping operation includes: receiving the geolocation for the sender and the geolocation for the recipient; determining the one or more shipping route options for the item based on the geolocation for the sender and the geolocation for the recipient; and sending the one or more shipping route options for display.

Clause 10. The system of Clause 9, where the method includes: scanning the shipping tag to obtain the blockchain address for the routing data block; generating a request to the blockchain address for the routing data block for next shipping information; receiving the next shipping information from the routing data block; and shipping the item to a geolocation based on the next shipping information.

Clause 11. The system of Clause 10, where the method includes: receiving the request to the blockchain address for the routing data block for next shipping information; and responsive to receiving the request to the blockchain address for the routing data block for next shipping information: determining one or more route options for the next shipping stage based on current conditions; providing the one or more options for the next shipping stage based on current conditions for display; receiving a selection of a selected one of the one or more options for the next shipping stage based on current conditions; and providing shipping information for the selected one of the one or more options for the next shipping stage in response to the request to the blockchain address for the routing data block for next shipping information.

Clause 12. The system of Clause 11, where the current conditions include one or more of current bid pricing, current availability, current time, current geolocation, current availability and equipment for one or more shippers, pickup time, delivery time, current weather conditions, current traffic conditions, an instruction from the recipient, current calendar data for the recipient, and time remaining until promised delivery.

Clause 13. The system of Clause 9, wherein: the operation of determining the one or more shipping route options for the item based on the geolocation for the sender and the geolocation for the recipient comprises: obtaining supporting data relating to one or more shipping entities, and determining the one or more shipping route options for the item based on the geolocation for the sender, the geolocation for the recipient, and the supporting data relating to one or more shipping entities; and the step of sending the one or more shipping route options for display includes: sending at least a portion of the supporting data relating to one or more shipping entities for display.

Clause 14. The method of Clause 13, wherein the supporting data relating to one or more shipping entities includes one or more of shipping route, pricing, availability, time to ship, delivery date, special handling capability, and reputational data.

Clause 15. One or more computer storage media having computer executable instructions stored thereon which, when executed by one or more processors, cause the processors to execute a method for shipping route selection, the method comprising: receiving sender shipping information and recipient shipping information for an item to be shipped; obtaining one or more shipping route options for the item based on the sender shipping information and recipient shipping operation; providing the one or more shipping route options for display; receiving a selection of one of the shipping route options as a selected shipping route option; creating a routing data block for the item on a blockchain, the routing data block having a blockchain address and the routing data block including shipping information for each stage of the selected shipping route; and encoding a shipping tag with the blockchain address of the routing data block for the item.

Clause 16. The computer storage media of Clause 15, the method further comprising: scanning the shipping tag to obtain the blockchain address for the routing data block; generating a request for next shipping information for a next stage of the selected shipping route from the routing data block using the blockchain address from the shipping tag; receiving the next shipping information from the routing data block; and shipping the item to a geolocation based on the next shipping information.

Clause 17. The computer storage media of Clause 15, wherein: the sender shipping information comprises at least one of an identifier and a geolocation for the sender; the recipient shipping information comprises at least one of an identifier and a geolocation for the recipient; the operation of obtaining one or more shipping route options for the item based on the sender shipping information and recipient shipping operation includes: receiving the geolocation for the sender and the geolocation for the recipient; determining the one or more shipping route options for the item based on the geolocation for the sender and the geolocation for the recipient; and sending the one or more shipping route options for display.

Clause 18. The computer storage media of Clause 17, wherein: the operation of determining the one or more shipping route options for the item based on the geolocation for the sender and the geolocation for the recipient comprises: obtaining supporting data relating to one or more shipping entities, and determining the one or more shipping route options for the item based on the geolocation for the sender, the geolocation for the recipient, and the supporting data relating to one or more shipping entities; and the step of sending the one or more shipping route options for display includes: sending at least a portion of the supporting data relating to one or more shipping entities for display.

Clause 19. The computer storage media of Clause 15, the method further comprising: receiving the request to the blockchain address for the routing data block for next shipping information; and responsive to receiving the request to the blockchain address for the routing data block for next shipping information: determining one or more route options for the next shipping stage based on current conditions; providing the one or more options for the next shipping stage based on current conditions for display; receiving a selection of a selected one of the one or more options for the next shipping stage based on current conditions; and providing shipping information for the selected one of the one or more options for the next shipping stage in response to the request to the blockchain address for the routing data block for next shipping information.

Clause 20. The computer storage media of Clause 15, where the current conditions include one or more of current bid pricing, current availability, current time, current geolocation, current availability and equipment for one or more shippers, pickup time, delivery time, current weather conditions, current traffic conditions, an instruction from the recipient, current calendar data for the recipient, and time remaining until promised delivery.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for creating one or more smart contracts, the computer-implemented method comprising:

receiving selection of a shipping route option for an item to be shipped as a selected shipping route;

responsive to receiving the selection of the shipping route option as the selected shipping route, creating a smart contract associated with the item on a blockchain, the smart contract including shipping information for each stage of the selected shipping route and public key data of one or more shipping entities associated with the selected shipping route;

receiving, at a contract address of the smart contract, a hashed request for shipping information for a next stage of the selected shipping route, wherein the hashed request was hashed via a private key corresponding to a public key of the public key data;

cryptographically authenticating, via the smart contract, the hashed request using the public key of the public key data, the public key corresponding to the private key; and providing, via the smart contract, the shipping information for the next stage of the selected shipping route for display.

2. The computer-implemented method of claim 1, further comprising encoding a shipping tag with the contract address of the smart contract for the item to be shipped.

3. The computer-implemented method of claim 2, wherein the shipping tag comprises one of a shipping label and an electronic device for attachment to the item to be shipped, and the computer-implemented method includes attaching the shipping tag to the item to be shipped.

4. The computer-implemented method of claim 1, further comprising creating an initial routing data block for the item on the blockchain, the initial routing data block having a blockchain address and the initial routing data block including the shipping information for each stage of the selected shipping route.

5. The computer-implemented method of claim 1, wherein the smart contract includes an identifier for a transaction for the item to be shipped.

6. The computer-implemented method of claim 1, further comprising:

determining, via the smart contract, that a geolocation address of the shipping information is a final geolocation address for the selected shipping route; and sending a notification to a recipient client device of a recipient, the notification indicating that the item is nearby the final geolocation address for the selected shipping route.

7. The computer-implemented method of claim 6, further comprising:

receiving, at the contract address of the smart contract, an authorization response from the recipient client device, the authorization response encrypted via a different private key corresponding to a different public key of the public key data; and decrypting, via the smart contract, the authorization response using the different public key of the public key data, the different public key corresponding to the different private key.

8. The computer-implemented method of claim 7, further comprising:

determining, via the smart contract, that the authorization response does not include a different geolocation address that is different from the final geolocation address, and wherein the providing, via the smart contract, of the shipping information for display includes providing the final geolocation address stored in the smart contract for display as part of the shipping information.

9. The computer-implemented method of claim 7, further comprising:

determining, via the smart contract, that the authorization response includes a different geolocation address that is different from the final geolocation address; and providing, via the smart contract, the different geolocation address as part of the shipping information.

10. A system for shipping an item, the system comprising:

one or more processors; and one or more memory devices in communication with the one or more processors, the one or more memory devices having computer-readable instructions stored thereupon that, when executed by the one or more processors, cause the one or more processors to perform a method for creating one or more smart contracts, the method comprising:

receiving selection of a shipping route option for an item to be shipped as a selected shipping route;

responsive to receiving the selection of the shipping route option as the selected shipping route, creating a smart contract associated with the item on a blockchain, the smart contract including shipping information for each stage of the selected shipping route and public key data of one or more shipping entities associated with the selected shipping route;

receiving, at a contract address of the smart contract, a hashed request for shipping information for a next stage of the selected shipping route, wherein the hashed request was hashed via a private key corresponding to a public key of the public key data;

cryptographically authenticating, via the smart contract, the hashed request using the public key of the public key data, the public key corresponding to the private key; and providing, via the smart contract, the shipping information for the next stage of the selected shipping route for display.

11. The system of claim 10, further comprising:

identifying the shipping route option for the item based on sender shipping information of a sender of the item to be shipped and recipient shipping information of a recipient of the item to be shipped; and providing the shipping route option for the item to be shipped for display.

12. The system of claim 11, wherein the identifying of the shipping route option for the item comprises:

obtaining supporting data relating to the one or more shipping entities associated with a shipping route of the shipping route option;

determining the shipping route option for the item based on the sender shipping information of the sender, the recipient shipping information of the recipient, and the supporting data relating to the one or more shipping entities; and the providing of the shipping route option for display includes providing at least a portion of the supporting data relating to the one or more shipping entities for display.

13. The system of claim 12, wherein the supporting data relating to the one or more shipping entities includes one or more of shipping route, pricing, availability, time to ship, delivery date, special handling capability, and reputational data.

14. The system of claim 10, further comprising creating an initial routing data block for the item on the blockchain, the initial routing data block having a blockchain address and the initial routing data block including the shipping information for each stage of the selected shipping route.

15. The system of claim 10, further comprising:

determining, via the smart contract, that a geolocation address of the shipping information is a final geolocation address for the selected shipping route; and sending a notification to a recipient client device of a recipient of the item, the notification indicating that the item is nearby the final geolocation address for the selected shipping route.

16. The system of claim 15, further comprising:

receiving, at the contract address of the smart contract, an authorization response from the recipient client device, the authorization response encrypted via a different private key corresponding to a different public key of the public key data; and decrypting, via the smart contract, the authorization response using the different public key of the public key data, the different public key corresponding to the different private key.

17. The system of claim 16, further comprising:

determining, via the smart contract, that the authorization response does not include a different geolocation address that is different from the final geolocation address; and returning the final geolocation address stored in the smart contract for display as part of the shipping information.

18. The system of claim 16, further comprising:

determining, via the smart contract, that the authorization response includes a different geolocation address that is different from the final geolocation address; and providing, via the smart contract, the different geolocation address as part of the shipping information.

19. A computer storage media having computer executable instructions stored thereon which, when executed by one or more processors, cause the one or more processors to execute a method for creating one or more smart contracts, the method comprising:

receiving selection of a shipping route option for an item as a selected shipping route;

responsive to receiving the selection of the shipping route option as the selected shipping route, creating a smart contract associated with the item on a blockchain, the smart contract including shipping information for each stage of the selected shipping route and public key data of one or more shipping entities associated with the selected shipping route;

receiving, at a contract address of the smart contract, a hashed request for shipping information for a next stage of the selected shipping route, wherein the hashed request was hashed via a private key corresponding to a public key of the public key data;

cryptographically authenticating, via the smart contract, the hashed request using the public key of the public key data, the public key corresponding to the private key; and providing, via the smart contract, the shipping information for the next stage of the selected shipping route for display.

20. The computer storage media of claim 19, further comprising encoding a shipping tag with the contract address of the smart contract for the item to be shipped.

* * * * *